United States Patent
Binder et al.

(10) Patent No.: US 12,424,236 B2
(45) Date of Patent: *Sep. 23, 2025

(54) VOICE TRIGGER FOR A DIGITAL ASSISTANT

(71) Applicant: Apple Inc., Cupertino, CA (US)

(72) Inventors: Justin Binder, Oakland, CA (US);
Samuel D. Post, San Jose, CA (US);
Onur Tackin, Saratoga, CA (US);
Thomas R. Gruber, Kihei, HI (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/068,717

(22) Filed: Mar. 3, 2025

(65) Prior Publication Data
US 2025/0201264 A1 Jun. 19, 2025

Related U.S. Application Data

(63) Continuation of application No. 18/986,508, filed on Dec. 18, 2024, which is a continuation of application
(Continued)

(51) Int. Cl.
*G10L 15/00* (2013.01)
*G06F 3/16* (2006.01)
(Continued)

(52) U.S. Cl.
CPC .............. *G10L 21/16* (2013.01); *G06F 3/167* (2013.01); *G10L 15/22* (2013.01); *G10L 15/26* (2013.01);
(Continued)

(58) Field of Classification Search
CPC ......... G10L 15/07; G10L 15/20; G10L 15/22; G10L 15/26; G10L 15/30; G10L 15/02;
(Continued)

(56) References Cited

U.S. PATENT DOCUMENTS 7,720,512 B2 5/2010 Tamura et al.
8,643,703 B1 2/2014 Karakotsios et al.
(Continued)

FOREIGN PATENT DOCUMENTS

AU 2017100557 A4 6/2017
CN 105917404 A 8/2016
(Continued)

OTHER PUBLICATIONS

Notice of Acceptance received for Australian Patent Application No. 2022224773, mailed on May 18, 2023, 3 pages.
(Continued)

*Primary Examiner* — Vu B Hang
(74) *Attorney, Agent, or Firm* — DLA Piper LLP (US)

(57) ABSTRACT

A method for operating a voice trigger is provided. In some implementations, the method is performed at an electronic device including one or more processors and memory storing instructions for execution by the one or more processors. The method includes receiving a sound input. The sound input may correspond to a spoken word or phrase, or a portion thereof. The method includes determining whether at least a portion of the sound input corresponds to a predetermined type of sound, such as a human voice. The method includes, upon a determination that at least a portion of the sound input corresponds to the predetermined type, determining whether the sound input includes predetermined content, such as a predetermined trigger word or phrase. The method also includes, upon a determination that the sound input includes the predetermined content, initiating a speech-based service, such as a voice-based digital assistant.

39 Claims, 10 Drawing Sheets

Related U.S. Application Data

No. 18/637,284, filed on Apr. 16, 2024, now Pat. No. 12,277,954, which is a continuation of application No. 18/135,649, filed on Apr. 17, 2023, now Pat. No. 12,009,007, which is a continuation of application No. 17/962,220, filed on Oct. 7, 2022, now Pat. No. 11,862,186, which is a continuation of application No. 17/713,741, filed on Apr. 5, 2022, now Pat. No. 11,557,310, which is a continuation of application No. 17/150,513, filed on Jan. 15, 2021, now Pat. No. 11,636,869, which is a continuation of application No. 16/879,348, filed on May 20, 2020, now Pat. No. 10,978,090, which is a continuation of application No. 16/222,249, filed on Dec. 17, 2018, now Pat. No. 10,714,117, which is a continuation of application No. 14/175,864, filed on Feb. 7, 2014, now Pat. No. 10,199,051.

(60) Provisional application No. 61/762,260, filed on Feb. 7, 2013.

(51) Int. Cl.
  G10L 15/22 (2006.01)
  G10L 15/26 (2006.01)
  G10L 17/24 (2013.01)
  G10L 21/16 (2013.01)
  G10L 15/02 (2006.01)
  G10L 15/30 (2013.01)
  G10L 25/51 (2013.01)
  G10L 25/84 (2013.01)

(52) U.S. Cl.
  CPC .............. *G10L 17/24* (2013.01); *G10L 15/02* (2013.01); *G10L 2015/223* (2013.01); *G10L 15/30* (2013.01); *G10L 25/51* (2013.01); *G10L 25/84* (2013.01)

(58) Field of Classification Search
  CPC ....... G10L 15/063; G10L 17/00; G10L 17/02; G10L 17/04; G10L 17/06; G10L 15/08; G10L 21/0208; G10L 25/87; G10L 25/78; G06F 3/16
  See application file for complete search history.

(56) References Cited

U.S. PATENT DOCUMENTS

| | | | |
|---|---|---|---|
| 8,683,054 B1 | 3/2014 | Karakotsios et al. | |
| 8,687,104 B2 | 4/2014 | Penov et al. | |
| 8,693,726 B2 | 4/2014 | Karakotsios et al. | |
| 8,706,827 B1 | 4/2014 | Noble et al. | |
| 8,861,310 B1 | 10/2014 | Karakotsios et al. | |
| 8,913,004 B1 | 12/2014 | Bozarth et al. | |
| 8,922,662 B1 | 12/2014 | Fu et al. | |
| 8,942,434 B1 | 1/2015 | Karakotsios et al. | |
| 8,943,582 B1 | 1/2015 | Zhou et al. | |
| 9,123,272 B1 | 9/2015 | Baldwin et al. | |
| 9,135,333 B2 | 9/2015 | Cameron et al. | |
| 9,152,185 B2 | 10/2015 | Karakotsios et al. | |
| 9,196,219 B1 | 11/2015 | Zhou et al. | |
| 9,201,585 B1 | 12/2015 | Karakotsios et al. | |
| 9,207,852 B1 | 12/2015 | Zhou et al. | |
| 9,223,415 B1 | 12/2015 | Zhou et al. | |
| 9,232,353 B2 | 1/2016 | Bozarth et al. | |
| 9,271,111 B2 | 2/2016 | Blanksteen | |
| 9,274,597 B1 | 3/2016 | Karakotsios et al. | |
| 9,282,222 B1 | 3/2016 | Karakotsios et al. | |
| 9,355,301 B2 | 5/2016 | Karakotsios et al. | |
| 9,400,575 B1 | 7/2016 | Karakotsios et al. | |
| 9,449,427 B1 | 9/2016 | Baldwin et al. | |
| 9,563,272 B2 | 2/2017 | Karakotsios et al. | |
| 9,691,000 B1 | 6/2017 | Karakotsios et al. | |
| 9,720,456 B1 | 8/2017 | Karakotsios et al. | |
| 9,740,297 B2 | 8/2017 | Karakotsios et al. | |
| 9,786,281 B1* | 10/2017 | Adams | G10L 15/26 |
| 9,946,803 B2 | 4/2018 | Karakotsios et al. | |
| 10,001,838 B2 | 6/2018 | Karakotsios et al. | |
| 10,019,984 B2 | 7/2018 | Kuo et al. | |
| 10,714,117 B2* | 7/2020 | Binder | G10L 17/24 |
| 10,778,778 B1 | 9/2020 | Blanksteen | |
| 11,240,390 B2 | 2/2022 | Kubota | |
| 11,995,457 B2 | 5/2024 | Ellis et al. | |
| 2008/0189110 A1 | 8/2008 | Freeman et al. | |
| 2009/0318198 A1 | 12/2009 | Carroll | |
| 2010/0123560 A1* | 5/2010 | Nix | H04Q 9/00 340/10.4 |
| 2011/0295590 A1 | 12/2011 | Lloyd et al. | |
| 2012/0046068 A1* | 2/2012 | Katpelly | G06F 16/284 455/550.1 |
| 2013/0109412 A1 | 5/2013 | Nguyen et al. | |
| 2013/0325844 A1 | 12/2013 | Plaisant | |
| 2014/0033071 A1 | 1/2014 | Gruber et al. | |
| 2014/0035824 A1 | 2/2014 | Bernstein et al. | |
| 2014/0046922 A1 | 2/2014 | Crook et al. | |
| 2014/0067403 A1 | 3/2014 | Burke et al. | |
| 2014/0081633 A1 | 3/2014 | Badaskar | |
| 2014/0156269 A1 | 6/2014 | Lee et al. | |
| 2014/0278413 A1 | 9/2014 | Pitschel et al. | |
| 2014/0365885 A1 | 12/2014 | Carson et al. | |
| 2017/0048341 A1 | 2/2017 | Karakotsios et al. | |
| 2019/0050196 A1 | 2/2019 | Li | |
| 2021/0375279 A1 | 12/2021 | Lee et al. | |
| 2022/0020142 A1 | 1/2022 | Anderson et al. | |
| 2022/0092269 A1 | 3/2022 | Le | |
| 2022/0392135 A1 | 12/2022 | Cundall et al. | |
| 2023/0036192 A1 | 2/2023 | Alakoye | |
| 2025/0036267 A1 | 1/2025 | Burgess et al. | |
| 2025/0037723 A1 | 1/2025 | Gruber et al. | |
| 2025/0046310 A1 | 2/2025 | Milden | |
| 2025/0053375 A1 | 2/2025 | Carson et al. | |
| 2025/0069605 A1 | 2/2025 | Kim et al. | |
| 2025/0078835 A1 | 3/2025 | Novitchenko et al. | |
| 2025/0118328 A1 | 4/2025 | Binder et al. | |

FOREIGN PATENT DOCUMENTS

| | | |
|---|---|---|
| EP | 2683147 A1 | 1/2014 |
| EP | 3179474 B1 | 7/2019 |
| EP | 2732436 B1 | 9/2019 |
| EP | 2898399 B1 | 11/2019 |
| EP | 2864932 B1 | 8/2020 |
| EP | 4276819 A2 | 11/2023 |
| JP | 4319573 B2 | 8/2009 |
| JP | 2010-217754 A | 9/2010 |
| WO | 2008/075082 A1 | 6/2008 |
| WO | 2011/088053 A2 | 7/2011 |
| WO | 2012/166277 A1 | 12/2012 |
| WO | 2013/048880 A1 | 4/2013 |
| WO | 2013/057153 A1 | 4/2013 |
| WO | 2013/173504 A1 | 11/2013 |
| WO | 2014/004544 A2 | 1/2014 |
| WO | 2014/004584 A2 | 1/2014 |
| WO | 2014/022306 A2 | 2/2014 |
| WO | 2014/040022 A2 | 3/2014 |
| WO | 2014/047047 A1 | 3/2014 |
| WO | 2014/093339 A1 | 6/2014 |
| WO | 2014/093911 A2 | 6/2014 |
| WO | 2014/144395 A2 | 9/2014 |
| WO | 2014/144949 A2 | 9/2014 |
| WO | 2014/149473 A1 | 9/2014 |
| WO | 2014/197635 A2 | 12/2014 |
| WO | 2014/197730 A1 | 12/2014 |
| WO | 2014/200728 A1 | 12/2014 |
| WO | 2014/200731 A1 | 12/2014 |
| WO | 2014/209264 A1 | 12/2014 |
| WO | 2014/210392 A2 | 12/2014 |

(56) References Cited

FOREIGN PATENT DOCUMENTS

WO 2015/108758 A1 7/2015
WO 2016/106494 A1 7/2016

OTHER PUBLICATIONS

Office Action received for Australian Patent Application No. 2022224773, mailed on Apr. 28, 2023, 3 pages.
Sarkar, et al., "Analysis and Modeling Pauses for Synthesis of Storytelling Speech Based on Discourse Modes", Proceedings of the IEEE International Conference on Contemporary Computing (IC3 2015),Aug. 11-13, 2015, 6 pages.
Sarkar, et al., "Development of Story Text-to-Speech System Based on Story Genres", Workshop on Machine Learning in Speech and Language Processing (MLSLP 2016), Sep. 13, 2016, 5 pages.
Sarkar, et al., "Modeling Pauses for Synthesis of Storytelling Style Speech Using Unsupervised Word Features", Second International Symposium on Computer Vision and the Internet (VisionNet'15), Procedia Computer Science, vol. 58,2015, 8 pages.
Tripathi, et al., "Sentence Based Discourse Classification for Hindi Story Text-to-Speech (TTS) System", Processing of the thirteenth International Conference on Natural Language Processing (ICON-2016) Dec. 2016, pp. 46-54.
Verma, et al., "Conversion of Neutral Speech to Storytelling Style Speech", Proceedings of the eighth IEEE International Conference on Advances in Pattern Recognition (ICAPR 2015)2015, 6 pages.
Notice of Acceptance received for Australian Patent Application No. 2024201212, mailed on Mar. 6, 2025, 3 pages.
Notice of Allowance received for Japanese Patent Application No. 2025-033999, mailed on Apr. 28, 2025, 4 pages (1 page of English Translation and 3 pages of Official Copy).
Office Action received for European Patent Application No. 20198363.2, mailed on Apr. 7, 2025, 4 pages.
Decision to Grant received for European Patent Application No. 22172862.9, mailed on May 15, 2025, 2 pages.
Result of Consultation received for European Patent Application No. 20198363.2, mailed on Jun. 12, 2025, 3 pages.

* cited by examiner

VOICE TRIGGER FOR A DIGITAL ASSISTANT

CROSS-REFERENCE TO RELATED APPLICATIONS

This application is a continuation of U.S. application Ser. No. 18/986,508, filed on Dec. 18, 2024, entitled VOICE TRIGGER FOR A DIGITAL ASSISTANT, which is a continuation of U.S. application Ser. No. 18/637,284, filed on Apr. 16, 2024, entitled VOICE TRIGGER FOR A DIGITAL ASSISTANT, which is a continuation of U.S. application Ser. No. 18/135,649 (now U.S. U.S. Pat. No. 12,009,007), filed on Apr. 17, 2023, entitled VOICE TRIGGER FOR A DIGITAL ASSISTANT, which is a continuation of U.S. application Ser. No. 17/962,220 (now U.S. Pat. No. 11,862,186), filed on Oct. 7, 2022, entitled VOICE TRIGGER FOR A DIGITAL ASSISTANT which is a continuation of U.S. application Ser. No. 17/713,741 (now U.S. Pat. No. 11,557,310), filed on Apr. 5, 2022, entitled VOICE TRIGGER FOR A DIGITAL ASSISTANT, which is a continuation of U.S. application Ser. No. 17/150,513 (now U.S. Pat. No. 11,636,869), filed on Jan. 15, 2021, entitled VOICE TRIGGER FOR A DIGITAL ASSISTANT, which is a continuation of U.S. application Ser. No. 16/879,348 (now U.S. Pat. No. 10,978,090), filed on May 20, 2020, entitled VOICE TRIGGER FOR A DIGITAL ASSISTANT, which is a continuation of U.S. Application Ser. No. 16/222,249 (now U.S. Pat. No. 10,714,117), filed on Dec. 17, 2018, entitled VOICE TRIGGER FOR A DIGITAL ASSISTANT, which is a continuation of U.S. application Ser. No. 14/175,864 (now U.S. Pat. No. 10,199,051), filed on Feb. 7, 2014, entitled VOICE TRIGGER FOR A DIGITAL ASSISTANT, which claims the benefit of U.S. Provisional Application No. 61/762,260, filed on Feb. 7, 2013, entitled VOICE TRIGGER FOR A DIGITAL ASSISTANT. The contents of each of these applications are hereby incorporated by reference in their entireties for all purposes.

TECHNICAL FIELD

The disclosed implementations relate generally to digital assistants, and more specifically, to a method and system for a voice trigger for a digital assistant.

BACKGROUND

Recently, voice-based digital assistants, such as Apple's SIRI, have been introduced into the marketplace to handle various tasks such as web searching and navigation. One advantage of such voice-based digital assistants is that users can interact with a device in a hands-free manner without handling or even looking at the device. Hands-free operation can be particularly beneficial when a person cannot or should not physically handle a device, such as when they are driving. However, to initiate the voice-based assistant, users typically must press a button or select an icon on a touch screen. This tactile input detracts from the hands-free experience. Accordingly, it would be advantageous to provide a method and system of activating a voice-based digital assistant (or other speech-based service) using a voice input or signal, and not a tactile input.

Activating a voice-based assistant using a voice input requires monitoring an audio channel to detect the voice input. This monitoring consumes electrical power, which is a limited resource on handheld or portable devices that rely on batteries and on which such voice-based digital assistants often run. Thus, it would be beneficial to provide an energy-efficient voice trigger that can be used to initiate voice- and/or speech-based services on a device.

SUMMARY

Accordingly, there is a need for a low-power voice trigger that can provide "always-listening" voice trigger functionality without excessively consuming limited power resources.

The implementations described below provide systems and methods for initiating a voice-based assistant using a voice trigger at an electronic device. Interactions with a voice-based digital assistant (or other speech-based services, such as a speech-to-text transcription service) often begin when a user presses an affordance (e.g., a button or icon) on a device in order to activate the digital assistant, followed by the device providing some indication to the user that the digital assistant is active and listening, such as a light, a sound (e.g., a beep), or a vocalized output (e.g., "what can I do for you?"). As described herein, voice triggers can also be implemented so that they are activated in response to a specific, predetermined word, phrase, or sound, and without requiring a physical interaction by the user. For example, a user may be able to activate a SIRI digital assistant on an iPhone (both provided by Apple Inc., the assignee of the present application) by reciting the phrase "Hey, SIRI." In response, the device outputs a beep, sound, or speech output (e.g., "what can I do for you?") indicating to the user that the listening mode is active. Accordingly, the user can initiate an interaction with the digital assistant without having to physically touch the device that provides the digital assistant functionality.

One technique for initiating a speech-based service with a voice trigger is to have the speech-based service continuously listen for a predetermined trigger word, phrase, or sound (any of which may be referred to herein as "the trigger sound"). However, continuously operating the speech-based service (e.g., the voice-based digital assistant) requires substantial audio processing and battery power. In order to reduce the power consumed by providing voice trigger functionality, several techniques may be employed. In some implementations, the main processor of an electronic device (i.e., an "application processor") is kept in a low-power or un-powered state while one or more sound detectors that use less power (e.g., because they do not rely on the application processor) remain active. (When it is in a low-power or un-powered state, an application processor or any other processor, program, or module may be described as inactive or in a standby mode.) For example, a low-power sound detector is used to monitor an audio channel for a trigger sound even when the application processor is inactive. This sound detector is sometimes referred to herein as a trigger sound detector. In some implementations, it is configured to detect particular sounds, phonemes, and/or words. The trigger sound detector (including hardware and/or software components) is designed to recognize specific words, sound, or phrases, but is generally not capable of or optimized for providing full speech-to-text functionality, as such tasks require greater computational and power resources. Thus, in some implementations, the trigger sound detector recognizes whether a voice input includes a predefined pattern (e.g., a sonic pattern matching the words "Hey, SIRI"), but is not able to (or is not configured to) convert the voice input into text or recognize a significant amount of other words. Once the trigger sound has been detected, then, the digital assistant is brought out of a standby mode so that the user can provide a voice command.

In some implementations, the trigger sound detector is configured to detect several different trigger sounds, such as a set of words, phrases, sounds, and/or combinations thereof. The user can then use any of those sounds to initiate the speech-based service. In one example, a voice trigger is preconfigured to respond to the phrases "Hey, SIRI," "Wake up, SIRI," "Invoke my digital assistant," or "Hello, HAL, do you read me, HAL?" In some implementations, the user must select one of the preconfigured trigger sounds as the sole trigger sound. In some implementations, the user selects a subset of the preconfigured trigger sounds, so that the user can initiate the speech-based service with different trigger sounds. In some implementations, all of the preconfigured trigger sounds remain valid trigger sounds.

In some implementations, another sound detector is used so that even the trigger sound detector can be kept in a low- or no-power mode for much of the time. For example, a different type of sound detector (e.g., one that uses less power than the trigger sound detector) is used to monitor an audio channel to determine whether the sound input corresponds to a certain type of sound. Sounds are categorized as different "types" based on certain identifiable characteristics of the sounds. For example, sounds that are of the type "human voice" have certain spectral content, periodicity, fundamental frequencies, etc. Other types of sounds (e.g., whistles, hand claps, etc.) have different characteristics. Sounds of different types are identified using audio and/or signal processing techniques, as described herein.

This sound detector is sometimes referred to herein as a "sound-type detector." For example, if a predetermined trigger phrase is "Hey, SIRI", the sound-type detector determines whether the input likely corresponds to human speech. If the trigger sound is a non-voiced sound, such as a whistle, the sound-type detector determines whether a sound input likely corresponds to a whistle. When the appropriate type of sound is detected, the sound-type detector initiates the trigger sound detector to further process and/or analyze the sound. And because the sound-type detector requires less power than the trigger sound detector (e.g., because it uses circuitry with lower power demands and/or more efficient audio processing algorithms than the trigger-sound detector), the voice trigger functionality consumes even less power than with a trigger sound detector alone.

In some implementations, yet another sound detector is used so that both the sound-type detector and the trigger sound detector described above can be kept in a low- or no-power mode for much of the time. For example, a sound detector that uses less power than the sound-type detector is used to monitor an audio channel to determine whether a sound input satisfies a predetermined condition, such as an amplitude (e.g., volume) threshold. This sound detector may be referred to herein as a noise detector. When the noise detector detects a sound that satisfies the predetermined threshold, the noise detector initiates the sound-type detector to further process and/or analyze the sound. And because the noise detector requires less power than either the sound-type detector or the trigger sound detector (e.g., because it uses circuitry with lower power demands and/or more efficient audio processing algorithms), the voice trigger functionality consumes even less power than the combination of the sound-type detector and the trigger sound detector without the noise detector.

In some implementations, any one or more of the sound detectors described above are operated according to a duty cycle, where they are cycled between "on" and "off" states. This further helps to reduce power consumption of the voice trigger. For example, in some implementations, the noise detector is "on" (i.e., actively monitoring an audio channel) for 10 milliseconds, and "off" for the following 90 milliseconds. This way, the noise detector is "off" 90% of the time, while still providing effectively continuous noise detection functionality. In some implementations, the on and off durations for the sound detectors are selected so that all of the detectors are be activated while the trigger sound is still being input. For example, for a trigger phrase of "Hey, SIRI," the sound detectors may be configured so that no matter where in the duty cycle(s) the trigger phrase begins, the trigger sound detector is activated in time to analyze a sufficient amount of the input. For example, the trigger sound detector will be activated in time to receive, process, and analyze the sounds "ay SIRI," which is enough to determine that the sound matches the trigger phrase. In some implementations, sound inputs are stored in memory as they are received and passed to an upstream detector so that a larger portion of the sound input can be analyzed. Accordingly, even if the trigger sound detector is not initiated until after a trigger phrase has been uttered, it can still analyze the entire recorded trigger phrase.

Some implementations provide a method for operating a voice trigger. The method is performed at an electronic device including one or more processors and memory storing instructions for execution by the one or more processors. The method includes receiving a sound input. The method further includes determining whether at least a portion of the sound input corresponds to a predetermined type of sound. The method further includes, upon a determination that at least a portion of the sound input corresponds to the predetermined type, determining whether the sound input includes predetermined content. The method further includes, upon a determination that the sound input includes the predetermined content, initiating a speech-based service. In some implementations, the speech-based service is a voice-based digital assistant. In some implementations, speech-based service is a dictation service.

In some implementations, determining whether the sound input corresponds to a predetermined type of sound is performed by a first sound detector, and determining whether the sound input includes predetermined content is performed by a second sound detector. In some implementations, the first sound detector consumes less power while operating than the second sound detector. In some implementations, the first sound detector performs frequency-domain analysis of the sound input. In some implementations, determining whether the sound input corresponds to the predetermined type of sound is performed upon a determination that the sound input satisfies a predetermined condition (e.g., as determined by a third sound detector, discussed below).

In some implementations, the first sound detector periodically monitors an audio channel according to a duty cycle. In some implementations, the duty cycle includes an on-time of about 20 milliseconds, and an off-time of about 100 milliseconds.

In some implementations, the predetermined type is a human voice and the predetermined content is one or more words. In some implementations, determining whether at least a portion of the sound input corresponds to the predetermined type of sound includes determining whether at least a portion of the sound input includes frequencies characteristic of a human voice.

In some implementations, the second sound detector is initiated in response to a determination by the first sound detector that the sound input corresponds to the predetermined type. In some implementations, the second sound detector is operated for at least a predetermined amount of time after a determination by the first sound detector that the sound input corresponds to the predetermined type. In some implementations, the predetermined amount of time corresponds to a duration of the predetermined content.

In some implementations, the predetermined content is one or more predetermined phonemes. In some implementations, the one or more predetermined phonemes constitute at least one word.

In some implementations, the method includes, prior to determining whether the sound input corresponds to a predetermined type of sound, determining whether the sound input satisfies a predetermined condition. In some implementations, the predetermined condition is an amplitude threshold. In some implementations, determining whether the sound input satisfies a predetermined condition is performed by a third sound detector, wherein the third sound detector consumes less power while operating than the first sound detector. In some implementations, the third sound detector periodically monitors an audio channel according to a duty cycle. In some implementations, the duty cycle includes an on-time of about 20 milliseconds, and an off-time of about 500 milliseconds. In some implementations, the third sound detector performs time-domain analysis of the sound input.

In some implementations, the method includes storing at least a portion of the sound input in memory, and providing the portion of the sound input to the speech-based service once the speech-based service is initiated. In some implementations, the portion of the sound input is stored in memory using direct memory access.

In some implementations, the method includes determining whether the sound input corresponds to a voice of a particular user. In some implementations, the speech-based service is initiated upon a determination that the sound input includes the predetermined content and that the sound input corresponds to the voice of the particular user. In some implementations, the speech-based service is initiated in a limited access mode upon a determination that the sound input includes the predetermined content and that the sound input does not correspond to the voice of the particular user. In some implementations, the method includes, upon a determination that the sound input corresponds to the voice of the particular user, outputting a voice prompt including a name of the particular user.

In some implementations, determining whether the sound input includes predetermined content includes comparing a representation of the sound input to a reference representation, and determining that the sound input includes the predetermined content when the representation of the sound input matches the reference representation. In some implementations, a match is determined if the representation of the sound input matches the reference representation to a predetermined confidence. In some implementations, the method includes receiving a plurality of sound inputs including the sound input; and iteratively adjusting the reference representation, using respective ones of the plurality of sound inputs, in response to determining that the respective sound inputs include the predetermined content.

In some implementations, the method includes determining whether the electronic device is in a predetermined orientation, and upon a determination that the electronic device is in the predetermined orientation, activating a predetermined mode of the voice trigger. In some implementations, the predetermined orientation corresponds to a display screen of the device being substantially horizontal and facing down, and the predetermined mode is a standby mode. In some implementations, the predetermined orientation corresponds to a display screen of the device being substantially horizontal and facing up, and the predetermined mode is a listening mode.

Some implementations provide a method for operating a voice trigger. The method is performed at an electronic device including one or more processors and memory storing instructions for execution by the one or more processors. The method includes operating a voice trigger in a first mode. The method further includes determining whether the electronic device is in a substantially enclosed space by detecting that one or more of a microphone and a camera of the electronic device is occluded. The method further includes, upon a determination that the electronic device is in a substantially enclosed space, switching the voice trigger to a second mode. In some implementations, the second mode is a standby mode.

Some implementations provide a method for operating a voice trigger. The method is performed at an electronic device including one or more processors and memory storing instructions for execution by the one or more processors. The method includes determining whether the electronic device is in a predetermined orientation, and, upon a determination that the electronic device is in the predetermined orientation, activating a predetermined mode of a voice trigger. In some implementations, the predetermined orientation corresponds to a display screen of the device being substantially horizontal and facing down, and the predetermined mode is a standby mode. In some implementations, the predetermined orientation corresponds to a display screen of the device being substantially horizontal and facing up, and the predetermined mode is a listening mode.

In accordance with some implementations, an electronic device includes a sound receiving unit configured to receive sound input; and a processing unit coupled to the sound receiving unit. The processing unit is configured to determine whether at least a portion of the sound input corresponds to a predetermined type of sound; upon a determination that at least a portion of the sound input corresponds to the predetermined type, determine whether the sound input includes predetermined content; and upon a determination that the sound input includes the predetermined content, initiate a speech-based service. In some implementations, the processing unit is further configured to, prior to determining whether the sound input corresponds to a predetermined type of sound, determine whether the sound input satisfies a predetermined condition. In some implementations, the processing unit is further configured to determine whether the sound input corresponds to a voice of a particular user.

In accordance with some implementations, an electronic device includes a voice trigger unit configured to operate a voice trigger in a first mode of a plurality of modes; and a processing unit coupled to the voice trigger unit. In some implementations, the processing unit is configured to: determine whether the electronic device is in a substantially enclosed space by detecting that one or more of a microphone and a camera of the electronic device is occluded; and upon a determination that the electronic device is in a substantially enclosed space, switch the voice trigger to a second mode. In some implementations, the processing unit is configured to determine whether the electronic device is in a predetermined orientation; and upon a determination that the electronic device is in the predetermined orientation, activate a predetermined mode of a voice trigger.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some implementations, an electronic device (e.g., a portable electronic device) is provided that comprises means for performing any of the methods described herein.

In accordance with some implementations, an electronic device (e.g., a portable electronic device) is provided that comprises a processing unit configured to perform any of the methods described herein.

In accordance with some implementations, an electronic device (e.g., a portable electronic device) is provided that comprises one or more processors and memory storing one or more programs for execution by the one or more processors, the one or more programs including instructions for performing any of the methods described herein.

In accordance with some implementations, an information processing apparatus for use in an electronic device is provided, the information processing apparatus comprising means for performing any of the methods described herein.

BRIEF DESCRIPTION OF THE DRAWINGS

Like reference numerals refer to corresponding parts throughout the drawings.

DESCRIPTION OF IMPLEMENTATIONS

Figure 1:
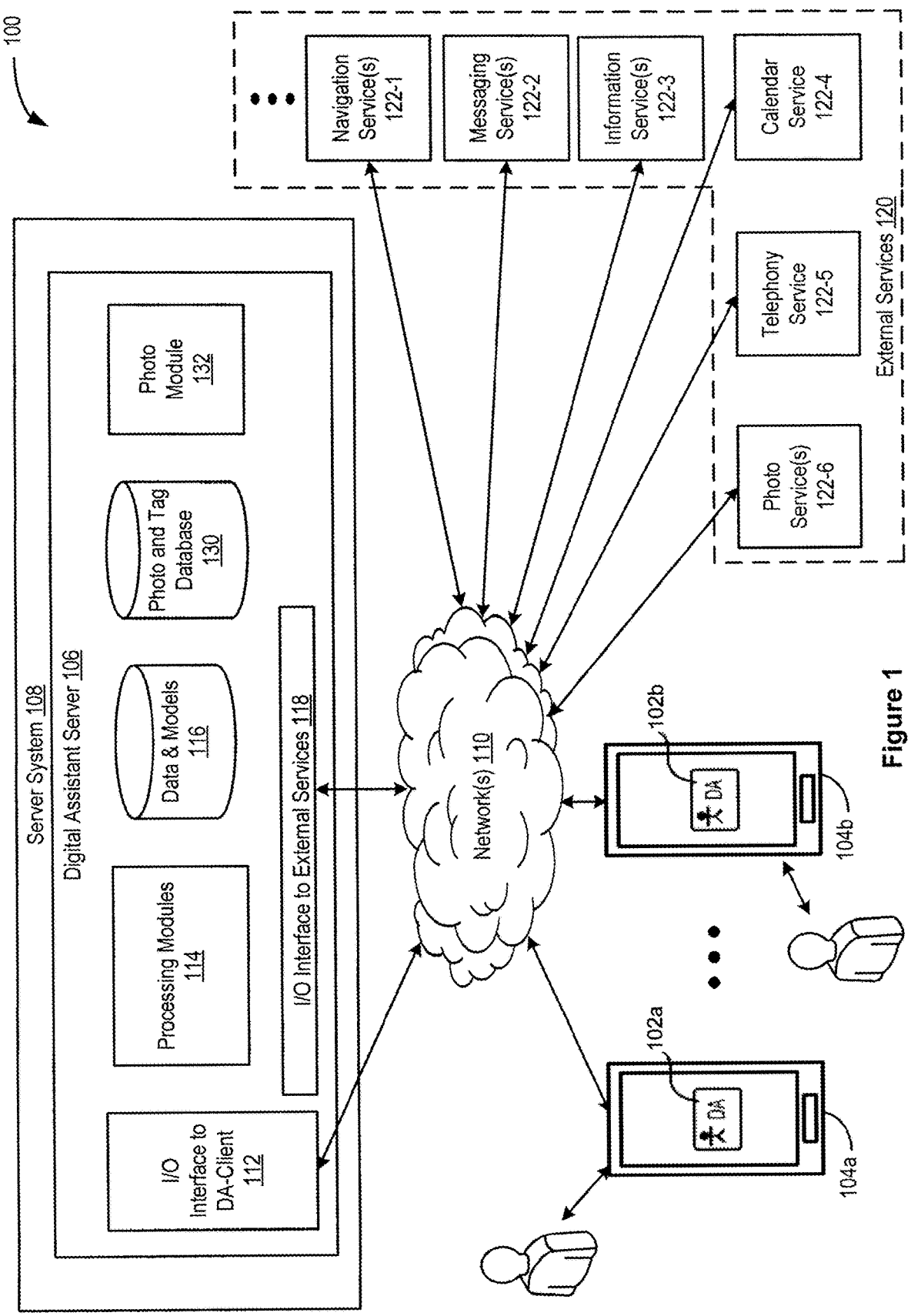
FIG. 1 is a block diagram illustrating an environment in which a digital assistant operates in accordance with some implementations.

FIG. 1 is a block diagram of an operating environment 100 of a digital assistant according to some implementations. The terms "digital assistant," "virtual assistant," "intelligent automated assistant," "voice-based digital assistant," or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, once initiated, a digital assistant system is capable of accepting a user request at least partially in the form of a natural language command, request, statement, narrative, and/or inquiry. Typically, the user request seeks either an informational answer or performance of a task by the digital assistant system. A satisfactory response to the user request is generally either provision of the requested informational answer, performance of the requested task, or a combination of the two. For example, a user may ask the digital assistant system a question, such as "Where am I right now?" Based on the user's current location, the digital assistant may answer, "You are in Central Park near the west gate." The user may also request the performance of a task, for example, by stating "Please invite my friends to my girlfriend's birthday party next week." In response, the digital assistant may acknowledge the request by generating a voice output, "Yes, right away," and then send a suitable calendar invite from the user's email address to each of the user' friends listed in the user's electronic address book or contact list. There are numerous other ways of interacting with a digital assistant to request information or performance of various tasks. In addition to providing verbal responses and taking programmed actions, the digital assistant can also provide responses in other visual or audio forms (e.g., as text, alerts, music, videos, animations, etc.).

As shown in FIG. 1, in some implementations, a digital assistant system is implemented according to a client-server model. The digital assistant system includes a client-side portion (e.g., 102a and 102b) (hereafter "digital assistant (DA) client 102") executed on a user device (e.g., 104a and 104b), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device or electronic device).

In some implementations, the DA server 106 includes a client-facing I/O interface 112, one or more processing modules 114, data and models 116, an I/O interface to external services 118, a photo and tag database 130, and a photo-tag module 132. The client-facing I/O interface facilitates the client-facing input and output processing for the digital assistant server 106. The one or more processing modules 114 utilize the data and models 116 to determine the user's intent based on natural language input and perform task execution based on the deduced user intent. Photo and tag database 130 stores fingerprints of digital photographs, and, optionally digital photographs themselves, as well as tags associated with the digital photographs. Photo-tag module 132 creates tags, stores tags in association with photographs and/or fingerprints, automatically tags photographs, and links tags to locations within photographs.

In some implementations, the DA server 106 communicates with external services 120 (e.g., navigation service(s) 122-1, messaging service(s) 122-2, information service(s) 122-3, calendar service 122-4, telephony service 122-5, photo service(s) 122-6, etc.) through the network(s) 110 for task completion or information acquisition. The I/O interface to the external services 118 facilitates such communications.

Examples of the user device 104 include, but are not limited to, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on at least one data processing apparatus and/or a distributed network of computers. In some implementations, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client side portion (e.g., the DA client 102) and a server-side portion (e.g., the DA server 106), in some implementations, a digital assistant system refers only to the server-side portion (e.g., the DA server 106). In some implementations, the functions of a digital assistant can be implemented as a standalone application installed on a user device. In addition, the divisions of functionalities between the client and server portions of the digital assistant can vary in different implementations. For example, in some implementations, the DA client 102 is a thin-client that provides only user-facing input and output processing functions, and delegates all other functionalities of the digital assistant to the DA server 106. In some other implementations, the DA client 102 is configured to perform or assist one or more functions of the DA server 106.

Figure 2:
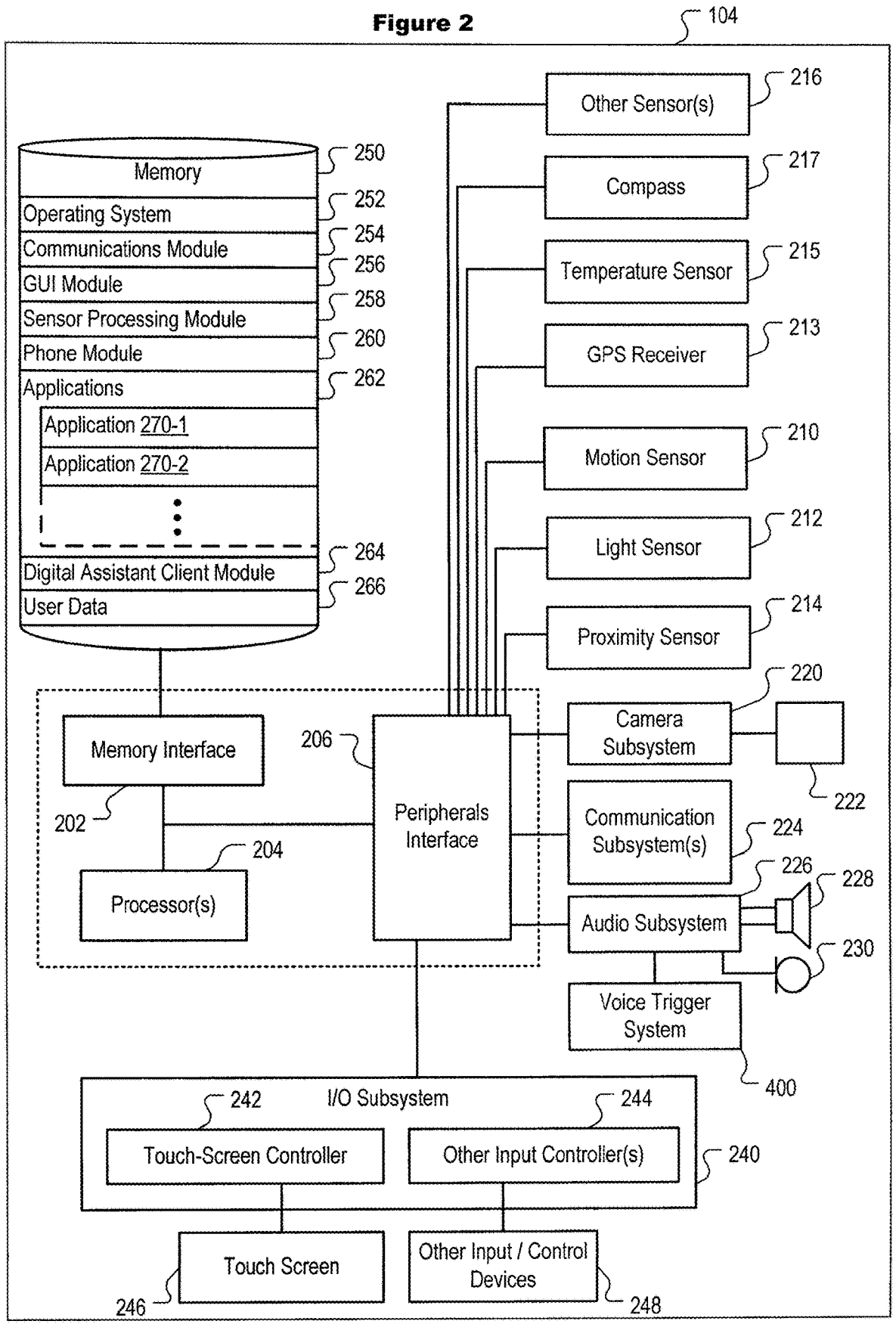
FIG. 2 is a block diagram illustrating a digital assistant client system in accordance with some implementations.

FIG. 2 is a block diagram of a user device 104 in accordance with some implementations. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, in some implementations, a motion sensor 210 (e.g., an accelerometer), a light sensor 212, a GPS receiver 213, a temperature sensor, and a proximity sensor 214 are coupled to the peripherals interface 206 to facilitate orientation, light, and proximity sensing functions. In some implementations, other sensors 216, such as a biometric sensor, barometer, and the like, are connected to the peripherals interface 206, to facilitate related functionalities.

In some implementations, the user device 104 includes a camera subsystem 220 coupled to the peripherals interface 206. In some implementations, an optical sensor 222 of the camera subsystem 220 facilitates camera functions, such as taking photographs and recording video clips. In some implementations, the user device 104 includes one or more wired and/or wireless communication subsystems 224 provide communication functions. The communication subsystems 224 typically includes various communication ports, radio frequency receivers and transmitters, and/or optical (e.g., infrared) receivers and transmitters. In some implementations, the user device 104 includes an audio subsystem 226 coupled to one or more speakers 228 and one or more microphones 230 to facilitate voice-enabled functions, such as voice recognition, voice replication, digital recording, and telephony functions. In some implementations, the audio subsystem 226 is coupled to a voice trigger system 400. In some implementations, the voice trigger system 400 and/or the audio subsystem 226 includes low-power audio circuitry and/or programs (i.e., including hardware and/or software) for receiving and/or analyzing sound inputs, including, for example, one or more analog-to-digital converters, digital signal processors (DSPs), sound detectors, memory buffers, codecs, and the like. In some implementations, the low-power audio circuitry (alone or in addition to other components of the user device 104) provides voice (or sound) trigger functionality for one or more aspects of the user device 104, such as a voice-based digital assistant or other speech-based service. In some implementations, the low-power audio circuitry provides voice trigger functionality even when other components of the user device 104 are shut down and/or in a standby mode, such as the processor(s) 204, I/O subsystem 240, memory 250, and the like. The voice trigger system 400 is described in further detail with respect to FIG. 4.

In some implementations, an I/O subsystem 240 is also coupled to the peripheral interface 206. In some implementations, the user device 104 includes a touch screen 246, and the I/O subsystem 240 includes a touch screen controller 242 coupled to the touch screen 246. When the user device 104 includes the touch screen 246 and the touch screen controller 242, the touch screen 246 and the touch screen controller 242 are typically con figured to, for example, detect contact and movement or break thereof using any of a plurality of touch sensitivity technologies, such as capacitive, resistive, infrared, surface acoustic wave technologies, proximity sensor arrays, and the like. In some implementations, the user device 104 includes a display that does not include a touch-sensitive surface. In some implementations, the user device 104 includes a separate touch-sensitive surface. In some implementations, the user device 104 includes other input controller(s) 244. When the user device 104 includes the other input controller(s) 244, the other input controller(s) 244 are typically coupled to other input/control devices 248, such as one or more buttons, rocker switches, thumb-wheel, infrared port, USB port, and/or a pointer device such as a stylus.

The memory interface 202 is coupled to memory 250. In some implementations, memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some implementations, memory 250 stores an operating system 252, a communications module 254, a graphical user interface module 256, a sensor processing module 258, a phone module 260, and applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The phone module 260 facilitates phone-related processes and functions. The applications 262 facilitates various functionalities of user applications, such as electronic-messaging, web browsing, media processing, navigation, imaging and/or other processes and functions. In some implementations, the user device 104 stores in memory 250 one or more software applications 270-1 and 270-2 each associated with at least one of the external service providers.

As described above, in some implementations, memory 250 also stores client-side digital assistant instructions (e.g., in a digital assistant client module 264) and various user data 266 (e.g., user-specific vocabulary data, preference data, and/or other data such as the user's electronic address book or contact list, to-do lists, shopping lists, etc.) to provide the client-side functionalities of the digital assistant.

In various implementations, the digital assistant client module 264 is capable of accepting voice input, text input, touch input, and/or gestural input through various user interfaces (e.g., the I/O subsystem 244) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some implementations, the digital assistant client module 264 utilizes various sensors, subsystems and peripheral devices to gather additional information from the surrounding environment of the user device 104 to establish a context associated with a user input. In some implementations, the digital assistant client module 264 provides the context information or a subset thereof with the user input to the digital assistant server (e.g., the digital assistant server 106, FIG. 1) to help deduce the user's intent.

In some implementations, the context information that can accompany the user input includes sensor information, e.g., lighting, ambient noise, ambient temperature, images or videos of the surrounding environment, etc. In some implementations, the context information also includes the physical state of the device, e.g., device orientation, device location, device temperature, power level, speed, acceleration, motion patterns, cellular signals strength, etc. In some implementations, information related to the software state of the user device 106, e.g., running processes, installed programs, past and present network activities, background services, error logs, resources usage, etc., of the user device 104 is also provided to the digital assistant server (e.g., the digital assistant server 106, FIG. 1) as context information associated with a user input.

In some implementations, the DA client module 264 selectively provides information (e.g., at least a portion of the user data 266) stored on the user device 104 in response to requests from the digital assistant server. In some implementations, the digital assistant client module 264 also elicits additional input from the user via a natural language dialogue or other user interfaces upon request by the digital assistant server 106 (FIG. 1). The digital assistant client module 264 passes the additional input to the digital assistant server 106 to help the digital assistant server 106 in intent deduction and/or fulfillment of the user's intent expressed in the user request.

In some implementations, memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
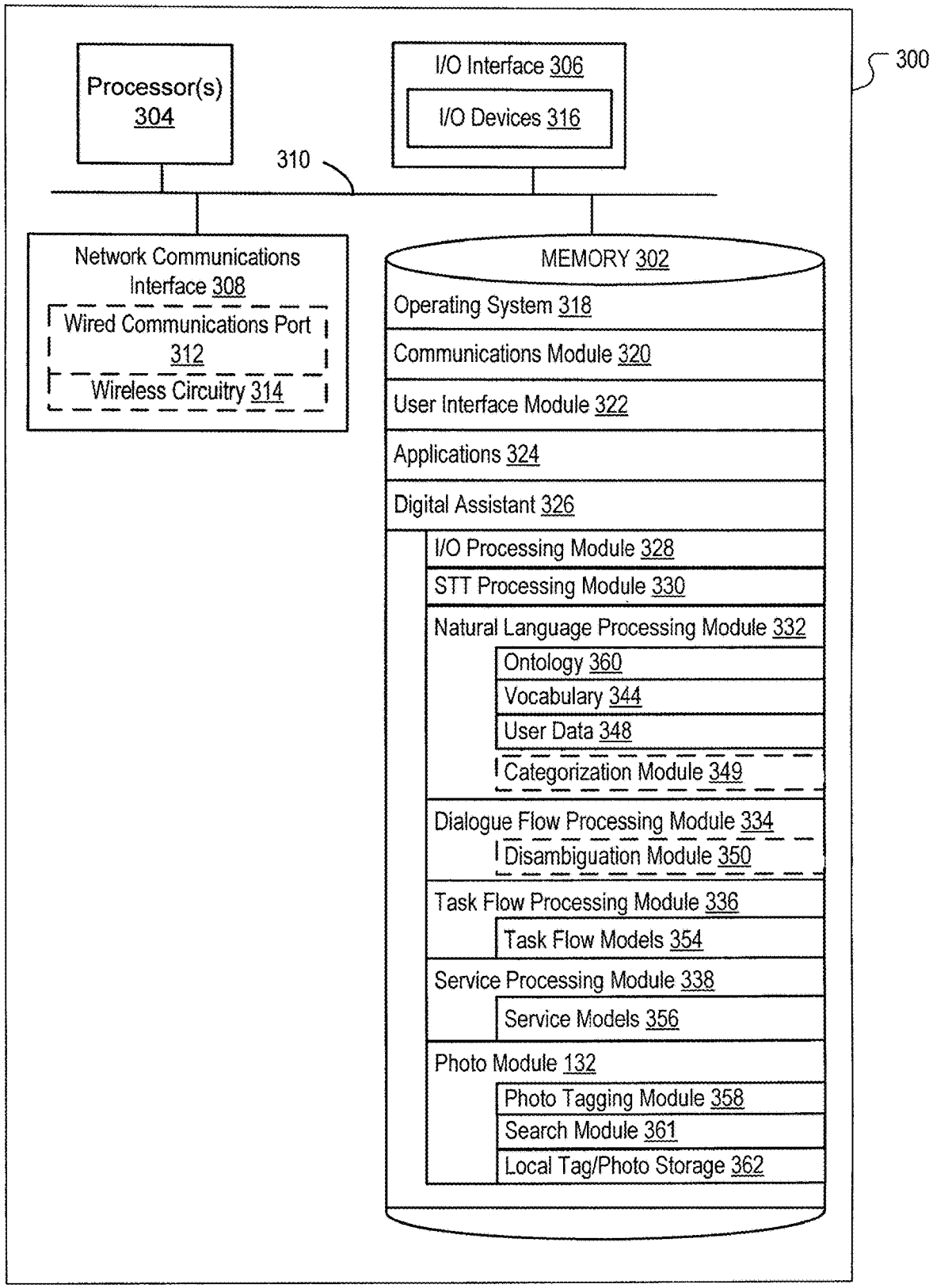
FIG. 3A is a block diagram illustrating a standalone digital assistant system or a digital assistant server system in accordance with some implementations.

FIG. 3A is a block diagram of an exemplary digital assistant system 300 (also referred to as the digital assistant) in accordance with some implementations. In some implementations, the digital assistant system 300 is implemented on a standalone computer system. In some implementations, the digital assistant system 300 is distributed across multiple computers. In some implementations, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some implementations, the digital assistant system 300 is an embodiment of the server system 108 (and/or the digital assistant server 106) shown in FIG. 1. In some implementations, the digital assistant system 300 is implemented in a user device (e.g., the user device 104, FIG. 1), thereby eliminating the need for a client-server system. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some implementations, memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some implementations, when the digital assistant is implemented on a standalone user device, the digital assistant system 300 includes any of the components and I/O and communication interfaces described with respect to the user device 104 in FIG. 2 (e.g., one or more microphones 230). In some implementations, the digital assistant system 300 represents the server portion of a digital assistant implementation, and interacts with the user through a client-side portion residing on a user device (e.g., the user device 104 shown in FIG. 2).

In some implementations, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VOIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some implementations, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some implementations, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

Memory 302 also stores the digital assistant module (or the server portion of a digital assistant) 326. In some implementations, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a photo module 132. Each of these processing modules has access to one or more of the following data and models of the digital assistant 326, or a subset or superset thereof: ontology 360, vocabulary index 344, user data 348, categorization module 349, disambiguation module 350, task flow models 354, service models 356, photo tagging module 358, search module 361, and local tag/photo storage 362.

In some implementations, using the processing modules (e.g., the input/output processing module 328, the STT processing module 330, the natural language processing module 332, the dialogue flow processing module 334, the task flow processing module 336, and/or the service processing module 338), data, and models implemented in the digital assistant module 326, the digital assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some implementations, the digital assistant also takes appropriate actions when a satisfactory response was not or could not be provided to the user for various reasons.

In some implementations, as discussed below, the digital assistant system 300 identifies, from a natural language input, a user's intent to tag a digital photograph, and processes the natural language input so as to tag the digital photograph with appropriate information. In some implementations, the digital assistant system 300 performs other tasks related to photographs as well, such as searching for digital photographs using natural language input, auto-tagging photographs, and the like.

Figure 3B:
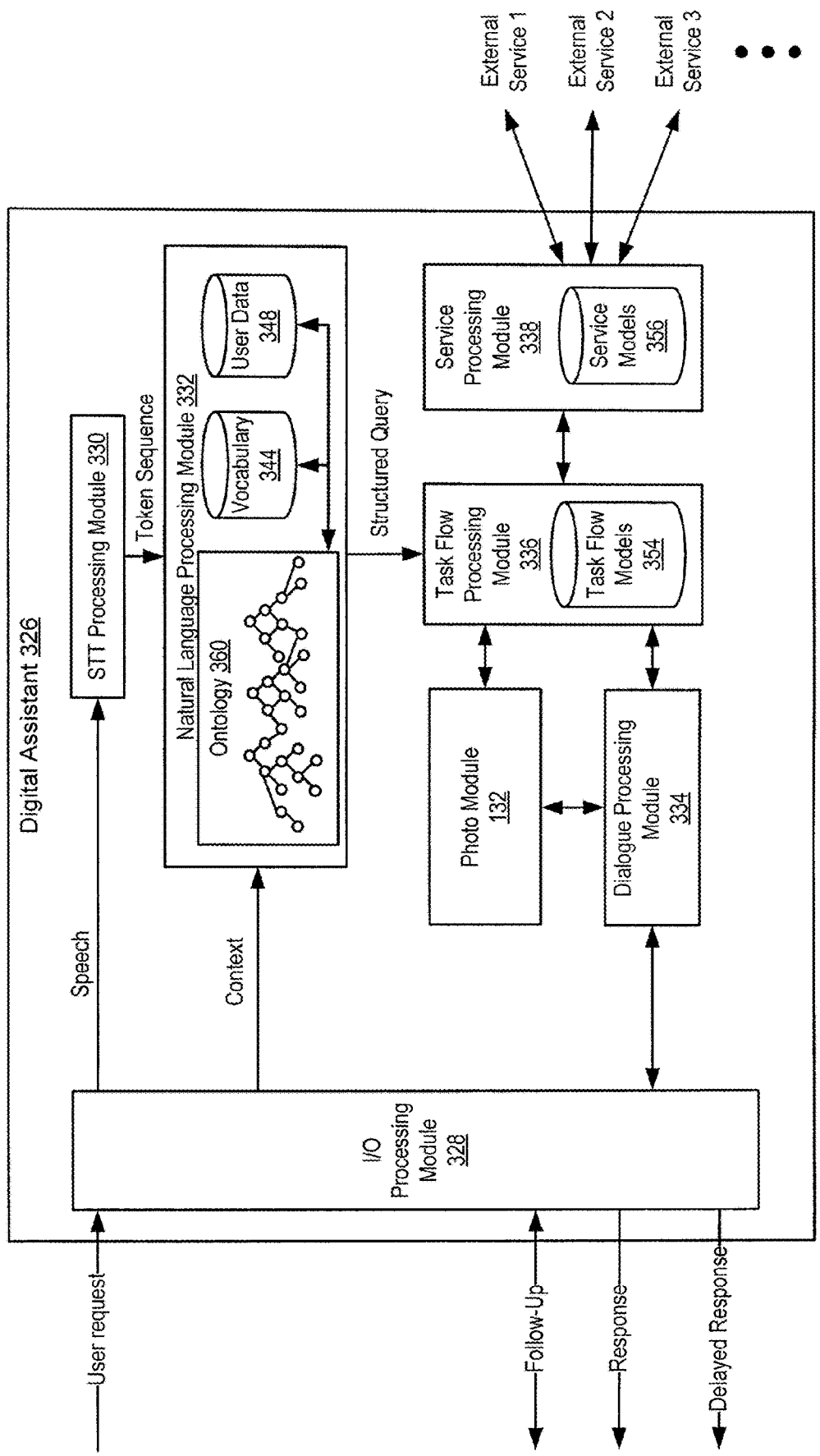
FIG. 3B is a block diagram illustrating functions of the digital assistant shown in FIG. 3A in accordance with some implementations.

As shown in FIG. 3B, in some implementations, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some implementations, the context information also includes software and hardware states of the device (e.g., the user device 104 in FIG. 1) at the time the user request is received, and/or information related to the surrounding environment of the user at the time that the user request was received. In some implementations, the I/O processing module 328 also sends follow-up questions to, and receives answers from, the user regarding the user request. In some implementations, when a user request is received by the I/O processing module 328 and the user request contains a speech input, the I/O processing module 328 forwards the speech input to the speech-to-text (STT) processing module 330 for speech-to-text conversions.

In some implementations, the speech-to-text processing module 330 receives speech input (e.g., a user utterance captured in a voice recording) through the I/O processing module 328. In some implementations, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some implementations, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some implementations, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some implementations, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some implementations, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, the ontology 360 shown in FIG. 3C includes a "restaurant reservation" node, which is an actionable intent node. Property nodes "restaurant," "date/time" (for the reservation), and "party size" are each directly linked to the "restaurant reservation" node (i.e., the actionable intent node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, the ontology 360 shown in FIG. 3C also includes a "set reminder" node, which is another actionable intent node. Property nodes "date/time" (for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362 and an example of a reminder domain 364 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." In some implementations, the ontology 360 is made up of many domains. Each domain may share one or more property nodes with one or more other domains. For example, the "date/time" property node may be associated with many other domains (e.g., a scheduling domain, a travel reservation domain, a movie ticket domain, etc.), in addition to the restaurant reservation domain 362 and the reminder domain 364.

Figure 3C:
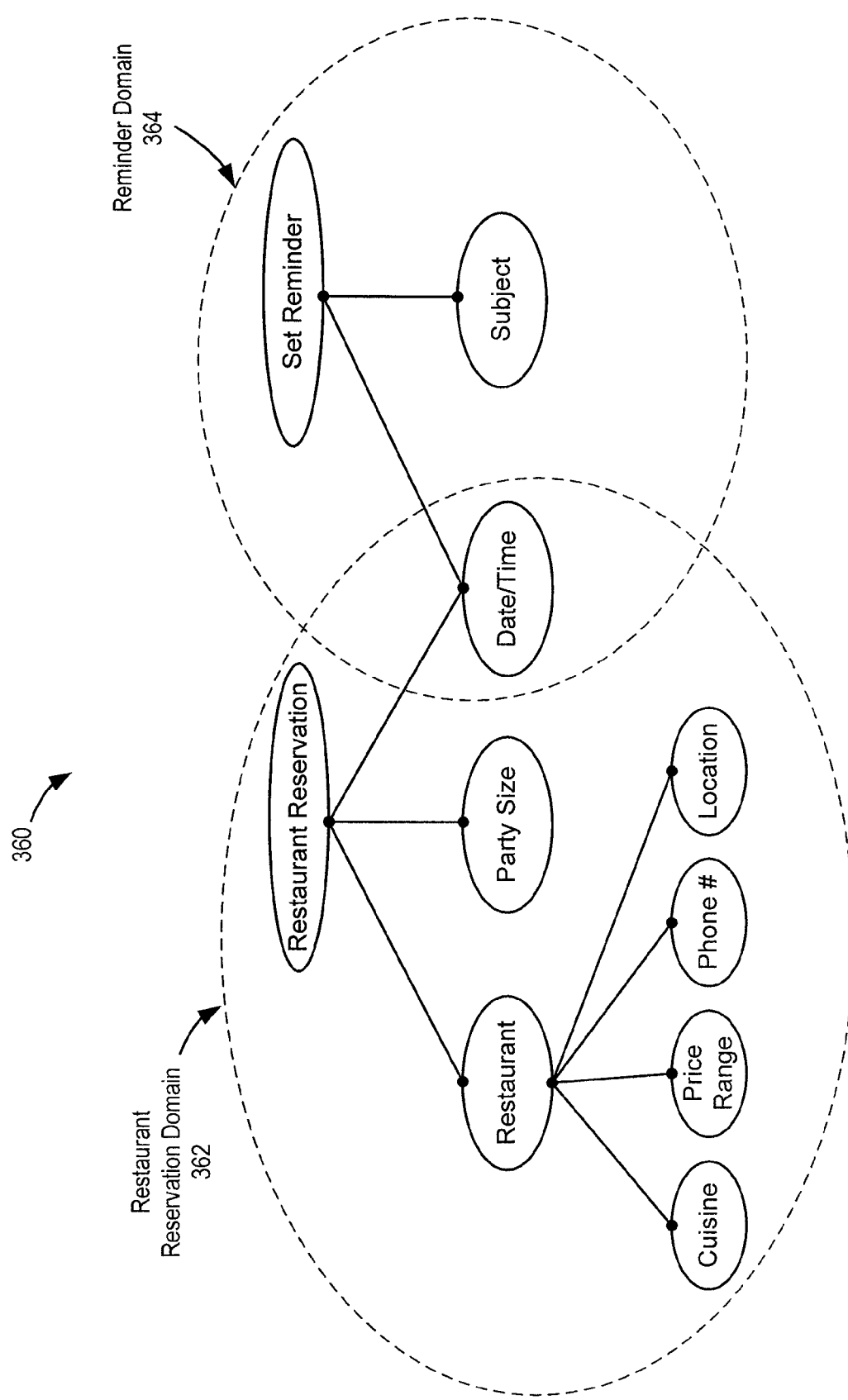
FIG. 3C is a network diagram illustrating a portion of an ontology in accordance with some implementations.

While FIG. 3C illustrates two exemplary domains within the ontology 360, the ontology 360 may include other domains (or actionable intents), such as "initiate a phone call," "find directions," "schedule a meeting," "send a message," and "provide an answer to a question," "tag a photo," and so on. For example, a "send a message" domain is associated with a "send a message" actionable intent node, and may further include property nodes such as "recipient(s)," "message type," and "message body." The property node "recipient" may be further defined, for example, by the sub-property nodes such as "recipient name" and "message address."

In some implementations, the ontology 360 includes all the domains (and hence actionable intents) that the digital assistant is capable of understanding and acting upon. In some implementations, the ontology 360 may be modified, such as by adding or removing domains or nodes, or by modifying relationships between the nodes within the ontology 360.

In some implementations, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some implementations, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some implementations, the natural language processor 332 shown in FIG. 3B receives the token sequence (e.g., a text string) from the speech-to-text processing module 330, and determines what nodes are implicated by the words in the token sequence. In some implementations, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some implementations, the domain that has the most "triggered" nodes is selected. In some implementations, the domain having the highest confidence value (e.g., based on the relative importance of its various triggered nodes) is selected. In some implementations, the domain is selected based on a combination of the number and the importance of the triggered nodes. In some implementations, additional factors are considered in selecting the node as well, such as whether the digital assistant system 300 has previously correctly interpreted a similar request from a user.

In some implementations, the digital assistant system 300 also stores names of specific entities in the vocabulary index 344, so that when one of these names is detected in the user request, the natural language processor 332 will be able to recognize that the name refers to a specific instance of a property or sub-property in the ontology. In some implementations, the names of specific entities are names of businesses, restaurants, people, movies, and the like. In some implementations, the digital assistant system 300 can search and identify specific entity names from other data sources, such as the user's address book or contact list, a movies database, a musicians database, and/or a restaurant database. In some implementations, when the natural language processor 332 identifies that a word in the token sequence is a name of a specific entity (such as a name in the user's address book or contact list), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

In some implementations, natural language processor 332 includes categorization module 349. In some implementations, the categorization module 349 determines whether each of the one or more terms in a text string (e.g., corresponding to a speech input associated with a digital photograph) is one of an entity, an activity, or a location, as discussed in greater detail below. In some implementations, the categorization module 349 classifies each term of the one or more terms as one of an entity, an activity, or a location.

Once the natural language processor 332 identifies an actionable intent (or domain) based on the user request, the natural language processor 332 generates a structured query to represent the identified actionable intent. In some implementations, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some implementations, the natural language processor 332 populates some parameters of the structured query with received context information. For example, if the user requested a sushi restaurant "near me," the natural language processor 332 may populate a {location} parameter in the structured query with GPS coordinates from the user device 104.

In some implementations, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some implementations, the various procedures necessary to complete these tasks are provided in task flow models 354. In some implementations, the task flow models 354 include procedures for obtaining additional information from the user, and task flows for performing actions associated with the actionable intent.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some implementations, the dialogue processing module 334 determines how (and/or when) to ask the user for the additional information, and receives and processes the user responses. In some implementations, the questions are provided to and answers are received from the users through the I/O processing module 328. For example, the dialogue processing module 334 presents dialogue output to the user via audio and/or visual output, and receives input from the user via spoken or physical (e.g., touch gesture) responses. Continuing with the example above, when the task flow processor 336 invokes the dialogue processor 334 to determine the "party size" and "date" information for the structured query associated with the domain "restaurant reservation," the dialogue processor 334 generates questions such as "For how many people?" and "On which day?" to pass to the user. Once answers are received from the user, the dialogue processing module 334 populates the structured query with the missing information, or passes the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue processor 334 disambiguate this property of the structured query. In turn, the dialogue processor 334 may ask the user "Which Bob?", and display (or read) a list of contacts named "Bob" from which the user may choose.

In some implementations, dialogue processor 334 includes disambiguation module 350. In some implementations, disambiguation module 350 disambiguates one or more ambiguous terms (e.g., one or more ambiguous terms in a text string corresponding to a speech input associated with a digital photograph). In some implementations, disambiguation module 350 identifies that a first term of the one or more teens has multiple candidate meanings, prompts a user for additional information about the first term, receives the additional information from the user in response to the prompt and identifies the entity, activity, or location associated with the first term in accordance with the additional information.

In some implementations, disambiguation module 350 disambiguates pronouns. In such implementations, disambiguation module 350 identifies one of the one or more terms as a pronoun and determines a noun to which the pronoun refers. In some implementations, disambiguation module 350 determines a noun to which the pronoun refers by using a contact list associated with a user of the electronic device. Alternatively, or in addition, disambiguation module 350 determines a noun to which the pronoun refers as a name of an entity, an activity, or a location identified in a previous speech input associated with a previously tagged digital photograph. Alternatively, or in addition, disambiguation module 350 determines a noun to which the pronoun refers as a name of a person identified based on a previous speech input associated with a previously tagged digital photograph.

In some implementations, disambiguation module 350 accesses information obtained from one or more sensors (e.g., proximity sensor 214, light sensor 212, GPS receiver 213, temperature sensor 215, and motion sensor 210) of a handheld electronic device (e.g., user device 104) for determining a meaning of one or more of the terms. In some implementations, disambiguation module 350 identifies two terms each associated with one of an entity, an activity, or a location. For example, a first of the two terms refers to a person, and a second of the two terms refers to a location. In some implementations, disambiguation module 350 identifies three terms each associated with one of an entity, an activity, or a location.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar. In another example, described in greater detail below, the task flow processor 336 executes steps and instructions associated with tagging or searching for digital photographs in response to a voice input, e.g., in conjunction with photo module 132.

In some implementations, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website or service, a banking portal, etc.,). In some implementations, the protocols and application programming interfaces (API) required by each service can be specified by a respective service model among the service models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameters to the online reservation service. When requested by the task flow processor 336, the service processor 338 can establish a network connection with the online reservation service using the web address stored in the service models 356, and send the necessary parameters of the reservation (e.g., time, date, party size) to the online reservation interface in a format according to the API of the online reservation service.

In some implementations, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some implementations, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some implementations, the digital assistant also requests the user to indicate whether the user is satisfied with the response produced by the digital assistant 326.

Figure 4:
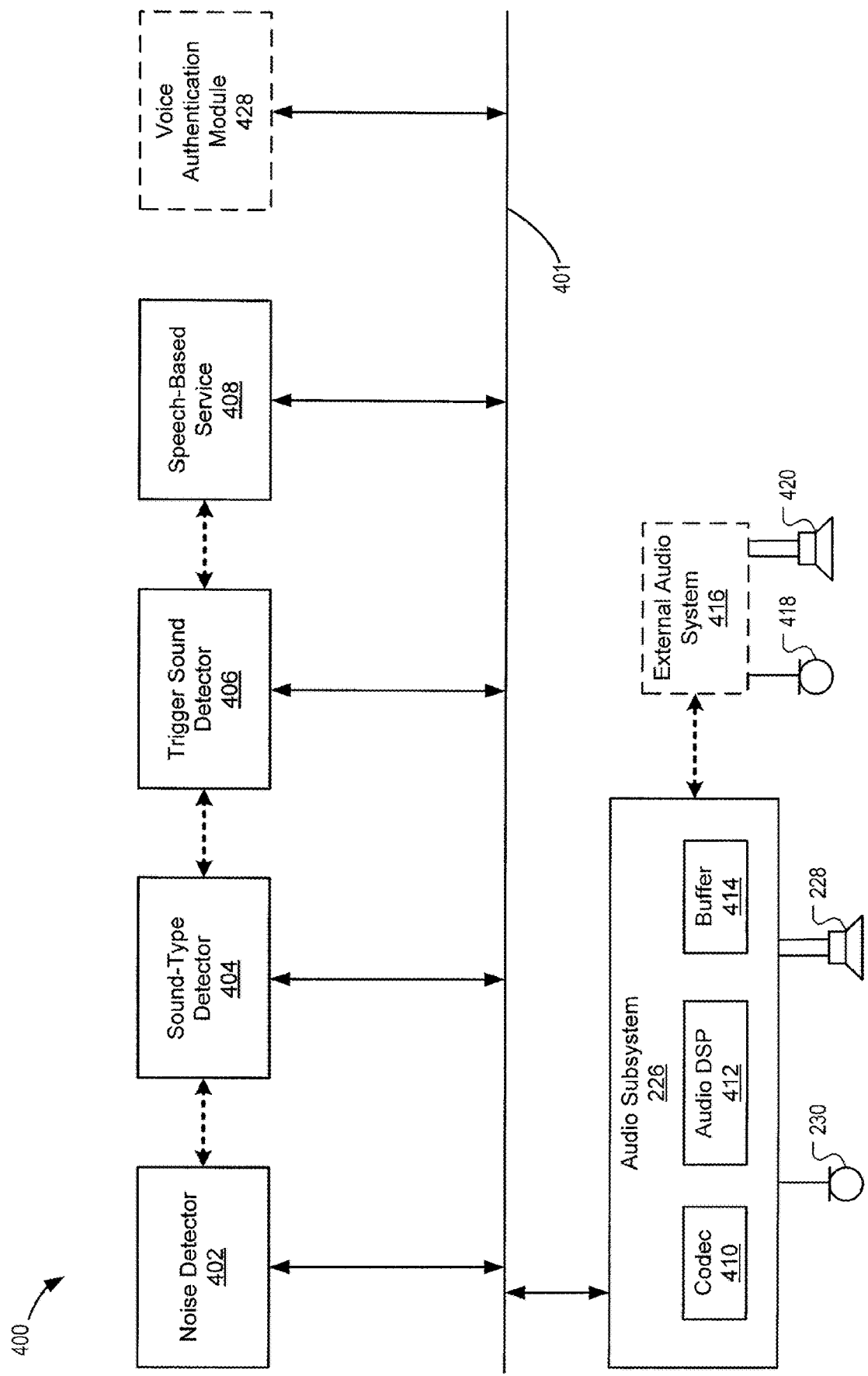
FIG. 4 is a block diagram illustrating components of a voice trigger system, in accordance with some implementations.

Attention is now directed to FIG. 4, which is a block diagram illustrating components of a voice trigger system 400, in accordance with some implementations. (The voice trigger system 400 is not limited to voice, and implementations described herein apply equally to non-voice sounds.) The voice trigger system 400 is composed of various components, modules, and/or software programs within the electronic device 104.

In some implementations, the voice trigger system 400 includes a noise detector 402, a sound-type detector 404, a trigger sound detector 406, and a speech-based service 408, and an audio subsystem 226, each coupled to an audio bus 401. In some implementations, more or fewer of these modules are used. The sound detectors 402, 404, and 406 may be referred to as modules, and may include hardware (e.g., circuitry, memory, processors, etc.), software (e.g., programs, software-on-a-chip, firmware, etc.), and/or any combinations thereof for performing the functionality described herein. In some implementations, the sound detectors are communicatively, programmatically, physically, and/or operationally coupled to one another (e.g., via a communications bus), as illustrated in FIG. 4 by the broken lines. (For ease of illustration, FIG. 4 shows each sound detector coupled only to adjacent sound detectors. It will be understood that the each sound detector can be coupled to any of the other sound detectors as well.)

In some implementations, the audio subsystem 226 includes a codec 410, an audio digital signal processor (DSP) 412, and a memory buffer 414. In some implementations, the audio subsystem 226 is coupled to one or more microphones 230 (FIG. 2) and one or more speakers 228 (FIG. 2). The audio subsystem 226 provides sound inputs to the sound detectors 402, 404, 406 and the speech-based service 408 (as well as other components or modules, such as a phone and/or baseband subsystem of a phone) for processing and/or analysis. In some implementations, the audio subsystem 226 is coupled to an external audio system 416 that includes at least one microphone 418 and at least one speaker 420.

In some implementations, the speech-based service 408 is a voice-based digital assistant, and corresponds to one or more components or functionalities of the digital assistant system described above with reference to FIGS. 1-3C. In some implementations, the speech-based service is a speech-to-text service, a dictation service, or the like.

In some implementations, the noise detector 402 monitors an audio channel to determine whether a sound input from the audio subsystem 226 satisfies a predetermined condition, such as an amplitude threshold. The audio channel corresponds to a stream of audio information received by one or more sound pickup devices, such as the one or more microphones 230 (FIG. 2). The audio channel refers to the audio information regardless of its state of processing or the particular hardware that is processing and/or transmitting the audio information. For example, the audio channel may refer to analog electrical impulses (and/or the circuits on which they are propagated) from the microphone 230, as well as a digitally encoded audio stream resulting from processing of the analog electrical impulses (e.g., by the audio subsystem 226 and/or any other audio processing system of the electronic device 104).

In some implementations, the predetermined condition is whether the sound input is above a certain volume for a predetermined amount of time. In some implementations, the noise detector uses time-domain analysis of the sound input, which requires relatively little computational and battery resources as compared to other types of analysis (e.g., as performed by the sound-type detector 404, the trigger word detector 406, and/or the speech-based service 408). In some implementations, other types of signal processing and/or audio analysis are used, including, for example, frequency-domain analysis. If the noise detector 402 determines that the sound input satisfies the predetermined condition, it initiates an upstream sound detector, such as the sound-type detector 404 (e.g., by providing a control signal to initiate one or more processing routines, and/or by providing power to the upstream sound detector). In some implementations, the upstream sound detector is initiated in response to other conditions being satisfied. For example, in some implementations, the upstream sound detector is initiated in response to determining that the device is not being stored in an enclosed space (e.g., based on a light detector detecting a threshold level of light).

The sound-type detector 404 monitors the audio channel to determine whether a sound input corresponds to a certain type of sound, such as sound that is characteristic of a human voice, whistle, clap, etc. The type of sound that the sound-type detector 404 is configured to recognize will correspond to the particular trigger sound(s) that the voice trigger is configured to recognize. In implementations where the trigger sound is a spoken word or phrase, the sound-type detector 404 includes a "voice activity detector" (VAD). In some implementations, the sound-type detector 404 uses frequency-domain analysis of the sound input. For example, the sound-type detector 404 generates a spectrogram of a received sound input (e.g., using a Fourier transform), and analyzes the spectral components of the sound input to determine whether the sound input is likely to correspond to a particular type or category of sounds (e.g., human speech). Thus, in implementations where the trigger sound is a spoken word or phrase, if the audio channel is picking up ambient sound (e.g., traffic noise) but not human speech, the VAD will not initiate the trigger sound detector 406.

In some implementations, the sound-type detector 404 remains active for as long as predetermined conditions of any downstream sound detector (e.g., the noise detector 402) are satisfied. For example, in some implementations, the sound-type detector 404 remains active as long as the sound input includes sound above a predetermined amplitude threshold (as determined by the noise detector 402), and is deactivated when the sound drops below the predetermined threshold. In some implementations, once initiated, the sound-type detector 404 remains active until a condition is met, such as the expiration of a timer (e.g., for 1, 2, 5, or 10 seconds, or any other appropriate duration), the expiration of a certain number of on/off cycles of the sound-type detector 404, or the occurrence of an event (e.g., the amplitude of the sound falls below a second threshold, as determined by the noise detector 402 and/or the sound-type detector 404).

As mentioned above, if the sound-type detector 404 determines that the sound input corresponds to a predetermined type of sound, it initiates an upstream sound detector (e.g., by providing a control signal to initiate one or more processing routines, and/or by providing power to the upstream sound detector), such as the trigger sound detector 406.

The trigger sound detector 406 is configured to determine whether a sound input includes at least part of certain predetermined content (e.g., at least part of the trigger word, phrase, or sound). In some implementations, the trigger sound detector 406 compares a representation of the sound input (an "input representation") to one or more reference representations of the trigger word. If the input representation matches at least one of the one or more reference representations with an acceptable confidence, the trigger sound detector 406 initiates the speech-based service 408 (e.g., by providing a control signal to initiate one or more processing routines, and/or by providing power to the upstream sound detector). In some implementations, the input representation and the one or more reference representations are spectrograms (or mathematical representations thereof), which represent how the spectral density of a signal varies with time. In some implementations, the representations are other types of audio signatures or voiceprints. In some implementations, initiating the speech-based service 408 includes bringing one or more circuits, programs, and/or processors out of a standby mode, and invoking the sound-based service. The sound-based service is then ready to provide more comprehensive speech recognition, speech-to-text processing, and/or natural language processing.

In some implementations, the voice-trigger system 400 includes voice authentication functionality, so that it can determine if a sound input corresponds to a voice of a particular person, such as an owner/user of the device. For example, in some implementations, the sound-type detector 404 uses a voice printing technique to determine that the sound input was uttered by an authorized user. Voice authentication and voice printing are described in more detail in U.S. patent application Ser. No. 13/053,144, assigned to the assignee of the instant application, which is hereby incorporated by reference in its entirety. In some implementations, voice authentication is included in any of the sound detectors described herein (e.g., the noise detector 402, the sound-type detector 404, the trigger sound detector 406, and/or the speech-based service 408). In some implementations, voice authentication is implemented as a separate module from the sound detectors listed above (e.g., as voice authentication module 428, FIG. 4), and may be operationally positioned after the noise detector 402, after the sound-type detector 404, after the trigger sound detector 406, or at any other appropriate position.

In some implementations, the trigger sound detector 406 remains active for as long as conditions of any downstream sound detector(s) (e.g., the noise detector 402 and/or the sound-type detector 404) are satisfied. For example, in some implementations, the trigger sound detector 406 remains active as long as the sound input includes sound above a predetermined threshold (as detected by the noise detector 402). In some implementations, it remains active as long as the sound input includes sound of a certain type (as detected by the sound-type detector 404). In some implementations, it remains active as long as both the foregoing conditions are met.

In some implementations, once initiated, the trigger sound detector 406 remains active until a condition is met, such as the expiration of a timer (e.g., for 1, 2, 5, or 10 seconds, or any other appropriate duration), the expiration of a certain number of on/off cycles of the trigger sound detector 406, or the occurrence of an event (e.g., the amplitude of the sound falls below a second threshold).

In some implementations, when one sound detector initiates another detector, both sound detectors remain active. However, the sound detectors may be active or inactive at various times, and it is not necessary that all of the downstream (e.g., the lower power and/or sophistication) sound detectors be active (or that their respective conditions are met) in order for upstream sound detectors to be active. For example, in some implementations, after the noise detector 402 and the sound-type detector 404 determine that their respective conditions are met, and the trigger sound detector 406 is initiated, one or both of the noise detector 402 and the sound-type detector 404 are deactivated and/or enter a standby mode while the trigger sound detector 406 operates. In other implementations, both the noise detector 402 and the sound-type detector 404 (or one or the other) stay active while the trigger sound detector 406 operates. In various implementations, different combinations of the sound detectors are active at different times, and whether one is active or inactive may depend on the state of other sound detectors, or may be independent of the state of other sound detectors.

While FIG. 4 describes three separate sound detectors, each configured to detect different aspects of a sound input, more or fewer sound detectors are used in various implementations of the voice trigger. For example, in some implementations, only the trigger sound detector 406 is used. In some implementations, the trigger sound detector 406 is used in conjunction with either the noise detector 402 or the sound-type detector 404. In some implementations, all of the detectors 402-406 are used. In some implementations, additional sound detectors are included as well.

Moreover, different combinations of sound detectors may be used at different times. For example, the particular combination of sound detectors and how they interact may depend on one or more conditions, such as the context or operating state of a device. As a specific example, if a device is plugged in (and thus not relying exclusively on battery power), the trigger sound detector 406 is active, while the noise detector 402 and the sound-type detector 404 remain inactive. In another example, if the device is in a pocket or backpack, all sound detectors are inactive.

By cascading sound detectors as described above, where the detectors that require more power are invoked only when necessary by detectors that require lower power, power efficient voice triggering functionality can be provided. As described above, additional power efficiency is achieved by operating one or more of the sound detectors according to a duty cycle. For example, in some implementations, the noise detector 402 operates according to a duty cycle so that it performs effectively continuous noise detection, even though the noise detector is off for at least part of the time. In some implementations, the noise detector 402 is on for 10 milliseconds and off for 90 milliseconds. In some implementations, the noise detector 402 is on for 20 milliseconds and off for 500 milliseconds. Other on and off durations are also possible.

In some implementations, if the noise detector 402 detects a noise during its "on" interval, the noise detector 402 will remain on in order to further process and/or analyze the sound input. For example, the noise detector 402 may be configured to initiate an upstream sound detector if it detects sound above a predetermined amplitude for a predetermined amount of time (e.g., 100 milliseconds). Thus, if the noise detector 402 detects sound above a predetermined amplitude during its 10 millisecond "on" interval, it will not immediately enter the "off" interval. Instead, the noise detector 402 remains active and continues to process the sound input to determine whether it exceeds the threshold for the full predetermined duration (e.g., 100 milliseconds).

In some implementations, the sound-type detector 404 operates according to a duty cycle. In some implementations, the sound-type detector 404 is on for 20 milliseconds and off for 100 milliseconds. Other on and off durations are also possible. In some implementations, the sound-type detector 404 is able to determine whether a sound input corresponds to a predetermined type of sound within the "on" interval of its duty cycle. Thus, the sound-type detector 404 will initiate the trigger sound detector 406 (or any other upstream sound detector) if the sound-type detector 404 determines, during its "on" interval, that the sound is of a certain type. Alternatively, in some implementations, if the sound-type detector 404 detects, during the "on" interval, sound that may correspond to the predetermined type, the detector will not immediately enter the "off" interval. Instead, the sound-type detector 404 remains active and continues to process the sound input and determine whether it corresponds to the predetermined type of sound. In some implementations, if the sound detector determines that the predetermined type of sound has been detected, it initiates the trigger sound detector 406 to further process the sound input and determine if the trigger sound has been detected.

Similar to the noise detector 402 and the sound-type detector 404, in some implementations, the trigger sound detector 406 operates according to a duty cycle. In some implementations, the trigger sound detector 406 is on for 50 milliseconds and off for 50 milliseconds. Other on and off durations are also possible. If the trigger sound detector 406 detects, during its "on" interval, that there is sound that may correspond to a trigger sound, the detector will not immediately enter the "off" interval. Instead, the trigger sound detector 406 remains active and continues to process the sound input and determine whether it includes the trigger sound. In some implementations, if such a sound is detected, the trigger sound detector 406 remains active to process the audio for a predetermined duration, such as 1, 2, 5, or 10 seconds, or any other appropriate duration. In some implementations, the duration is selected based on the length of the particular trigger word or sound that it is configured to detect. For example, if the trigger phrase is "Hey, SIRI," the trigger word detector is operated for about 2 seconds to determine whether the sound input includes that phrase.

In some implementations, some of the sound detectors are operated according to a duty cycle, while others operate continuously when active. For example, in some implementations, only the first sound detector is operated according to a duty cycle (e.g., the noise detector 402 in FIG. 4), and upstream sound detectors are operated continuously once they are initiated. In some other implementations, the noise detector 402 and the sound-type detector 404 are operated according to a duty cycle, while the trigger sound detector 406 is operated continuously. Whether a particular sound detector is operated continuously or according to a duty cycle depends on one or more conditions, such as the context or operating state of a device. In some implementations, if a device is plugged in and not relying exclusively on battery power, all of the sound detectors operate continuously once they are initiated. In other implementations, the noise detector 402 (or any of the sound detectors) operates according to a duty cycle if the device is in a pocket or backpack (e.g., as determined by sensor and/or microphone signals), but operates continuously when it is determined that the device is likely not being stored. In some implementations, whether a particular sound detector is operated continuously or according to a duty cycle depends on the battery charge level of the device. For example, the noise detector 402 operates continuously when the battery charge is above 50%, and operates according to a duty cycle when the battery charge is below 50%.

In some implementations, the voice trigger includes noise, echo, and/or sound cancellation functionality (referred to collectively as noise cancellation). In some implementations, noise cancellation is performed by the audio subsystem 226 (e.g., by the audio DSP 412). Noise cancellation reduces or removes unwanted noise or sounds from the sound input prior to it being processed by the sound detectors. In some cases, the unwanted noise is background noise from the user's environment, such as a fan or the clicking from a keyboard. In some implementations, the unwanted noise is any sound above, below, or at predetermined amplitudes or frequencies. For example, in some implementations, sound above the typical human vocal range (e.g., 3,000 Hz) is filtered out or removed from the signal. In some implementations, multiple microphones (e.g., the microphones 230) are used to help determine what components of received sound should be reduced and/or removed. For example, in some implementations, the audio subsystem 226 uses beam forming techniques to identify sounds or portions of sound inputs that appear to originate from a single point in space (e.g., a user's mouth). The audio subsystem 226 then focuses on this sound by removing from the sound input sounds that are received equally by all microphones (e.g., ambient sound that does not appear to originate from any particular direction).

In some implementations, the DSP 412 is configured to cancel or remove from the sound input sounds that are being output by the device on which the digital assistant is operating. For example, if the audio subsystem 226 is outputting music, radio, a podcast, a voice output, or any other audio content (e.g., via the speaker 228), the DSP 412 removes any of the outputted sound that was picked up by a microphone and included in the sound input. Thus, the sound input is free of the outputted audio (or at least contains less of the outputted audio). Accordingly, the sound input that is provided to the sound detectors will be cleaner, and the triggers more accurate. Aspects of noise cancellation are described in more detail in U.S. Pat. No. 7,272,224, assigned to the assignee of the instant application, which is hereby incorporated by reference in its entirety.

In some implementations, different sound detectors require that the sound input be filtered and/or preprocessed in different ways. For example, in some implementations, the noise detector 402 is configured to analyze time-domain audio signal between 60 and 20,000 Hz, and the sound-type detector is configured to perform frequency-domain analysis of audio between 60 and 3,000 Hz. Thus, in some implementations, the audio DSP 412 (and/or other audio DSPs of the device 104) preprocesses received audio according to the respective needs of the sound detectors. In some implementations, on the other hand, the sound detectors are configured to filter and/or preprocess the audio from the audio subsystem 226 according to their specific needs. In such cases, the audio DSP 412 may still perform noise cancellation prior to providing the sound input to the sound detectors.

In some implementations, the context of the electronic device is used to help determine whether and how to operate the voice trigger. For example, it may be unlikely that users will invoke a speech-based service, such as a voice-based digital assistant, when the device is stored in their pocket, purse, or backpack. Also, it may be unlikely that users will invoke a speech-based service when they are at a loud rock concert. For some users, it is unlikely that they will invoke a speech-based service at certain times of the day (e.g., late at night). On the other hand, there are also contexts in which it is more likely that a user will invoke a speech-based service using a voice trigger. For example, some users will be more likely to use a voice trigger when they are driving, when they are alone, when they are at work, or the like. Various techniques are used to determine the context of a device. In various implementations, the device uses information from any one or more of the following components or information sources to determine the context of a device: GPS receivers, light sensors, microphones, proximity sensors, orientation sensors, inertial sensors, cameras, communications circuitry and/or antennas, charging and/or power circuitry, switch positions, temperature sensors, compasses, accelerometers, calendars, user preferences, etc.

The context of the device can then be used to adjust how and whether the voice trigger operates. For example, in certain contexts, the voice trigger will be deactivated (or operated in a different mode) as long as that context is maintained. For example, in some implementations, the voice trigger is deactivated when the phone is in a predetermined orientation (e.g., lying face-down on a surface), during predetermined time periods (e.g., between 10:00 PM and 8:00 AM), when the phone is in a "silent" or a "do not disturb" mode (e.g., based on a switch position, mode setting, or user preference), when the device is in a substantially enclosed space (e.g., a pocket, bag, purse, drawer, or glove box), when the device is near other devices that have a voice trigger and/or speech-based services (e.g., based on proximity sensors, acoustic/wireless/infrared communications), and the like. In some implementations, instead of being deactivated, the voice trigger system 400 is operated in a low-power mode (e.g., by operating the noise detector 402 according to a duty cycle with a 10 millisecond "on" interval and a 5 second "off" interval). In some implementations, an audio channel is monitored more infrequently when the voice trigger system 400 is operated in a low-power mode. In some implementations, a voice trigger uses a different sound detector or combination of sound detectors when it is in a low-power mode than when it is in a normal mode. (The voice trigger may be capable of numerous different modes or operating states, each of which may use a different amount of power, and different implementations will use them according to their specific designs.)

On the other hand, when the device is in some other contexts, the voice trigger will be activated (or operated in a different mode) so long as that context is maintained. For example, in some implementations, the voice trigger remains active while it is plugged into a power source, when the phone is in a predetermined orientation (e.g., lying face-up on a surface), during predetermined time periods (e.g., between 8:00 AM and 10:00 PM), when the device is travelling and/or in a car (e.g., based on GPS signals, BLUETOOTH connection or docking with a vehicle, etc.), and the like. Aspects of detect lining when a device is in a vehicle are described in more detail in U.S. Provisional Patent Application No. 61/657,744, assigned to the assignee of the instant application, which is hereby incorporated by reference in its entirety. Several specific examples of how to determine certain contexts are provided below. In various embodiments, different techniques and/or information sources are used to detect these and other contexts.

As noted above, whether or not the voice trigger system 400 is active (e.g., listening) can depend on the physical orientation of a device. In some implementations, the voice trigger is active when the device is placed "face-up" on a surface (e.g., with the display and/or touchscreen surface visible), and/or is inactive when it is "face-down." This provides a user with an easy way to activate and/or deactivate the voice trigger without requiring manipulation of settings menus, switches, or buttons. In some implementations, the device detects whether it is face-up or face-down on a surface using light sensors (e.g., based on the difference in incident light on a front and a back face of the device 104), proximity sensors, magnetic sensors, accelerometers, gyroscopes, tilt sensors, cameras, and the like.

In some implementations, other operating modes, settings, parameters, or preferences are affected by the orientation and/or position of the device. In some implementations, the particular trigger sound, word, or phrase of the voice trigger is listening for depends on the orientation and/or position of the device. For example, in some implementations, the voice trigger listens for a first trigger word, phrase, or sound when the device is in one orientation (e.g., laying face-up on a surface), and a different trigger word, phrase, or sound when the device is in another orientation (e.g., laying face-down). In some implementations, the trigger phrase for a face-down orientation is longer and/or more complex than for a face-up orientation. Thus, a user can place a device face-down when they are around other people or in a noisy environment so that the voice trigger can still be operational while also reducing false accepts, which may be more frequent for shorter or simpler trigger words. As a specific example, a face-up trigger phrase may be "Hey, SIRI," while a face-down trigger phrase may be "Hey, SIRI, this is Andrew, please wake up." The longer trigger phrase also provides a larger voice sample for the sound detectors and/or voice authenticators to process and/or analyze, thus increasing the accuracy of the voice trigger and decreasing false accepts.

In some implementations, the device 104 detects whether it is in a vehicle (e.g., a car). A voice trigger is particularly beneficial for invoking a speech-based service when the user is in a vehicle, as it helps reduce the physical interactions that are necessary to operate the device and/or the speech based service. Indeed, one of the benefits of a voice-based digital assistant is that it can be used to perform tasks where looking at and touching a device would be impractical or unsafe. Thus, the voice trigger may be used when the device is in a vehicle so that the user does not have to touch the device in order to invoke the digital assistant. In some implementations, the device determines that it is in a vehicle by detecting that it has been connected to and/or paired with a vehicle, such as through BLUETOOTH communications (or other wireless communications) or through a docking connector or cable. In some implementations, the device determines that it is in a vehicle by determining the device's location and/or speed (e.g., using GPS receivers, accelerometers, and/or gyroscopes). If it is determined that the device is likely in a vehicle, because it is travelling above 20 miles per hour and is determined to be travelling along a road, for example, then the voice trigger remains active and/or in a high-power or more sensitive state.

In some implementations, the device detects whether the device is stored (e.g., in a pocket, purse, bag, a drawer, or the like) by determining whether it is in a substantially enclosed space. In some implementations, the device uses light sensors (e.g., dedicated ambient light sensors and/or cameras) to determine that it is stored. For example, in some implementations, the device is likely being stored if light sensors detect little or no light. In some implementations, the time of day and/or location of the device are also considered. For example, if the light sensors detect low light levels when high light levels would be expected (e.g., during the day), the device may be in storage and the voice trigger system 400 not needed. Thus, the voice trigger system 400 will be placed in a low-power or standby state.

In some implementations, the difference in light detected by sensors located on opposite faces of a device can be used to determine its position, and hence whether or not it is stored. Specifically, users are likely to attempt to activate a voice trigger when the device is resting on a table or surface rather than when it is being stored in a pocket or bag. But when a device is lying face-down (or face-up) on a surface such as a table or desk, one surface of the device will be occluded so that little or no light reaches that surface, while the other surface will be exposed to ambient light. Thus, if light sensors on the front and back face of a device detect significantly different light levels, the device determines that it is not being stored. On the other hand, if light sensors on opposite faces detect the same or similar light levels, the device determines that it is being stored in a substantially enclosed space. Also, if the light sensors both detect a low light level during the daytime (or when the device would expect the phone to be in a bright environment, the device determines with a greater confidence that it is being stored.

In some implementations, other techniques are used (instead of or in addition to light sensors) to determine whether the device is stored. For example, in some implementations, the device emits one or more sounds (e.g., tones, clicks, pings, etc.) from a speaker or transducer (e.g., speaker 228), and monitors one or more microphones or transducers (e.g., microphone 230) to detect echoes of the omitted sound(s). (In some implementations, the device emits inaudible signals, such as sound outside of the human hearing range.) From the echoes, the device determines characteristics of the surrounding environment. For example, a relatively large environment (e.g., a room or a vehicle) will reflect the sound differently than a relatively small, enclosed environment (e.g., a pocket, purse, bag, a drawer, or the like).

In some implementations, the voice trigger system 400 is operates differently if it is near other devices (such as other devices that have voice triggers and/or speech-based services) than if it is not near other devices. This may be useful, for example, to shut down or decrease the sensitivity of the voice trigger system 400 when many devices are close together so that if one person utters a trigger word, other surrounding devices are not triggered as well. In some implementations, a device determines proximity to other devices using RFID, near-field communications, infrared/acoustic signals, or the like.

As noted above, voice triggers are particularly useful when a device is being operated in a hands-free mode, such as when the user is driving. In such cases, users often use external audio systems, such as wired or wireless headsets, watches with speakers and/or microphones, a vehicle's built-in microphones and speakers, etc., to free themselves from having to hold a device near their face to make a call or dictate text inputs. For example, wireless headsets and vehicle audio systems may connect to an electronic device using BLUETOOTH communications, or any other appropriate wireless communication. However, it may be inefficient for a voice trigger to monitor audio received via a wireless audio accessory because of the power required to maintain an open audio channel with the wireless accessory. In particular, a wireless headset may hold enough charge in its battery to provide a few hours of continuous talk-time, and it is therefore preferable to reserve the battery for when the headset is needed for actual communication, instead of using it to simply monitor ambient audio and wait for a possible trigger sound. Moreover, wired external headset accessories may require significantly more power than on-board microphones alone, and keeping the headset microphone active will deplete the device's battery charge. This is especially true considering that the ambient audio received by the wireless or wired headset will typically consist mostly of silence or irrelevant sounds. Thus, in some implementations, the voice trigger system 400 monitors audio from the microphone 230 on the device even when the device is coupled to an external microphone (wired or wireless). Then, when the voice trigger detects the trigger word, the device initializes an active audio link with the external microphone in order to receive subsequent sound inputs (such as a command to a voice-based digital assistant) via the external microphone rather than the on-device microphone 230.

When certain conditions are met, though, an active communication link can be maintained between an external audio system 416 (which may be communicatively coupled to the device 104 via wires or wirelessly) and the device so that the voice trigger system 400 can listen for a trigger sound via the external audio system 416 instead of (or in addition to) the on-device microphone 230. For example, in some implementations, characteristics of the motion of the electronic device and/or the external audio system 416 (e.g., as determined by accelerometers, gyroscopes, etc. on the respective devices) are used to determine whether the voice trigger system 400 should monitor ambient sound using the on-device microphone 230 or an external microphone 418. Specifically, the difference between the motion of the device and the external audio system 416 provides information about whether the external audio system 416 is actually in use. For example, if both the device and a wireless headset are moving (or not moving) substantially identically, it may be determined that the headset is not in use or is not being worn. This may occur, for example, because both devices are near to each other and idle (e.g., sitting on a table or stored in a pocket, bag, purse, drawer, etc.). Accordingly, under these conditions, the voice trigger system 400 monitors the on-device microphone, because it is unlikely that the headset is actually being used. If there is a difference in motion between the wireless headset and the device, however, it is determined that the headset is being worn by a user. These conditions may occur, for example, because the device has been set down (e.g., on a surface or in a bag), while the headset is being worn on the user's head (which will likely move at least a small amount, even when the wearer is relatively still). Under these conditions, because it is likely that the headset is being worn, the voice trigger system 400 maintains an active communication link and monitors the microphone 418 of the headset instead of (or in addition to) the on-device microphone 230. And because this technique focuses on the difference in the motion of the device and the headset, motion that is common to both devices can be canceled out. This may be useful, for example, when a user is using a headset in a moving vehicle, where the device (e.g., a cellular phone) is resting in a cup holder, empty seat, or in the user's pocket, and the headset is worn on the user's head. Once the motion that is common to both devices is cancelled out (e.g., the vehicle's motion), the relative motion of the headset as compared to the device (if any) can be determined in order to determine whether the headset is likely in use (or, whether the headset is not being worn). While the above discussion refers to wireless headsets, similar techniques are applied to wired headsets as well.

Because people's voices vary greatly, it may be necessary or beneficial to tune a voice trigger to improve its accuracy in recognizing the voice of a particular user. Also, people's voices may change over time, for example, because of illnesses, natural voice changes relating to aging or hormonal changes, and the like. Thus, in some implementations, the voice trigger system 400 is able to adapt its voice and/or sound recognition profiles for a particular user or group of users.

As described above, sound detectors (e.g., the sound-type detector 404 and/or the trigger sound detector 406) may be configured to compare a representation of a sound input (e.g., the sound or utterance provided by a user) to one or more reference representations. For example, if an input representation matches the reference representation to a predetermined confidence level, the sound detector will determine that the sound input corresponds to a predetermined type of sound (e.g., the sound-type detector 404), or that the sound input includes predetermined content (e.g., the trigger sound detector 406). In order to tune the voice trigger system 400, in some implementations, the device adjusts the reference representation to which the input representation is compared. In some implementations, the reference representation is adjusted (or created) as part of a voice enrollment or "training" procedure, where a user outputs the trigger sound several times so that the device can adjust (or create) the reference representation. The device can then create a reference representation using that person's actual voice.

In some implementations, the device uses trigger sounds that are received under normal use conditions to adjust the reference representation. For example, after a successful voice triggering event (e.g., where the sound input was found to satisfy all of the triggering criteria) the device will use information from the sound input to adjust and/or tune the reference representation. In some implementations, only sound inputs that were determined to satisfy all or some of the triggering criteria with a certain confidence level are used to adjust the reference representation. Thus, when the voice trigger is less confident that a sound input corresponds to or includes a trigger sound, that voice input may be ignored for the purposes of adjusting the reference representation. On the other hand, in some implementations, sound inputs that satisfied the voice trigger system 400 to a lower confidence are used to adjust the reference representation.

In some implementations, the device 104 iteratively adjusts the reference representation (using these or other techniques) as more and more sound inputs are received so that slight changes in a user's voice over time can be accommodated. For example, in some implementations, the device 104 (and/or associated devices or services) adjusts the reference representation after each successful triggering event. In some implementations, the device 104 analyzes the sound input associated with each successful triggering event and determines if the reference representations should be adjusted based on that input (e.g., if certain conditions are met), and only adjusts the reference representation if it is appropriate to do so. In some implementations, the device 104 maintains a moving average of the reference representation over time.

In some implementations, the voice trigger system 400 detects sounds that do not satisfy one or more of the triggering criteria (e.g., as determined by one or more of the sound detectors), but that may actually be attempts by an authorized user to do so. For example, voice trigger system 400 may be configured to respond to a trigger phrase such as "Hey, SIRI", but if a user's voice has changed (e.g., due to sickness, age, accent/inflection changes, etc.), the voice trigger system 400 may not recognize the user's attempt to activate the device. (This may also occur when the voice trigger system 400 has not been properly tuned for that user's particular voice, such as when the voice trigger system 400 is set to default conditions and/or the user has not performed an initialization or training procedure to customize the voice trigger system 400 for his or her voice.) If the voice trigger system 400 does not respond to the user's first attempt to active the voice trigger, the user is likely to repeat the trigger phrase. The device detects that these repeated sound inputs are similar to one another, and/or that they are similar to the trigger phrase (though not similar enough to cause the voice trigger system 400 to activate the speech-based service). If such conditions are met, the device determines that the sound inputs correspond to valid attempts to activate the voice trigger system 400. Accordingly, in some implementations, the voice trigger system 400 uses those received sound inputs to adjust one or more aspects of the voice trigger system 400 so that similar utterances by the user will be accepted as valid triggers in the future. In some implementations, these sound inputs are used to adapt the voice trigger system 400 only if a certain conditions or combinations of conditions are met. For example, in some implementations, the sound inputs are used to adapt the voice trigger system 400 when a predetermined number of sound inputs are received in succession (e.g., 2, 3, 4, 5, or any other appropriate number), when the sound inputs are sufficiently similar to the reference representation, when the sound inputs are sufficiently similar to each other, when the sound inputs are close together (e.g., when they are received within a predetermined time period and/or at or near a predetermined interval), and/or any combination of these or other conditions.

In some cases, the voice trigger system 400 may detect one or more sound inputs that do not satisfy one or more of the triggering criteria, followed by a manual initiation of the speech-based service (e.g., by pressing a button or icon). In some implementations, the voice trigger system 400 determines that, because speech-based service was initiated shortly after the sound inputs were received, the sound inputs actually corresponded to failed voice triggering attempts. Accordingly, the voice trigger system 400 uses those received sound inputs to adjust one or more aspects of the voice trigger system 400 so that utterances by the user will be accepted as valid triggers in the future, as described above.

While the adaptation techniques described above refer to adjusting a reference representation, other aspects of the trigger sound detecting techniques may be adjusted in the same or similar manner in addition to or instead of adjusting the reference representation. For example, in some implementations, the device adjusts how sound inputs are filtered and/or what filters are applied to sound inputs, such as to focus on and/or eliminate certain frequencies or ranges of frequencies of a sound input. In some implementations, the device adjusts an algorithm that is used to compare the input representation with the reference representation. For example, in some implementations, one or more terms of a mathematical function used to determine the difference between an input representation and a reference representation are changed, added, or removed, or a different mathematical function is substituted.

Figure 5:
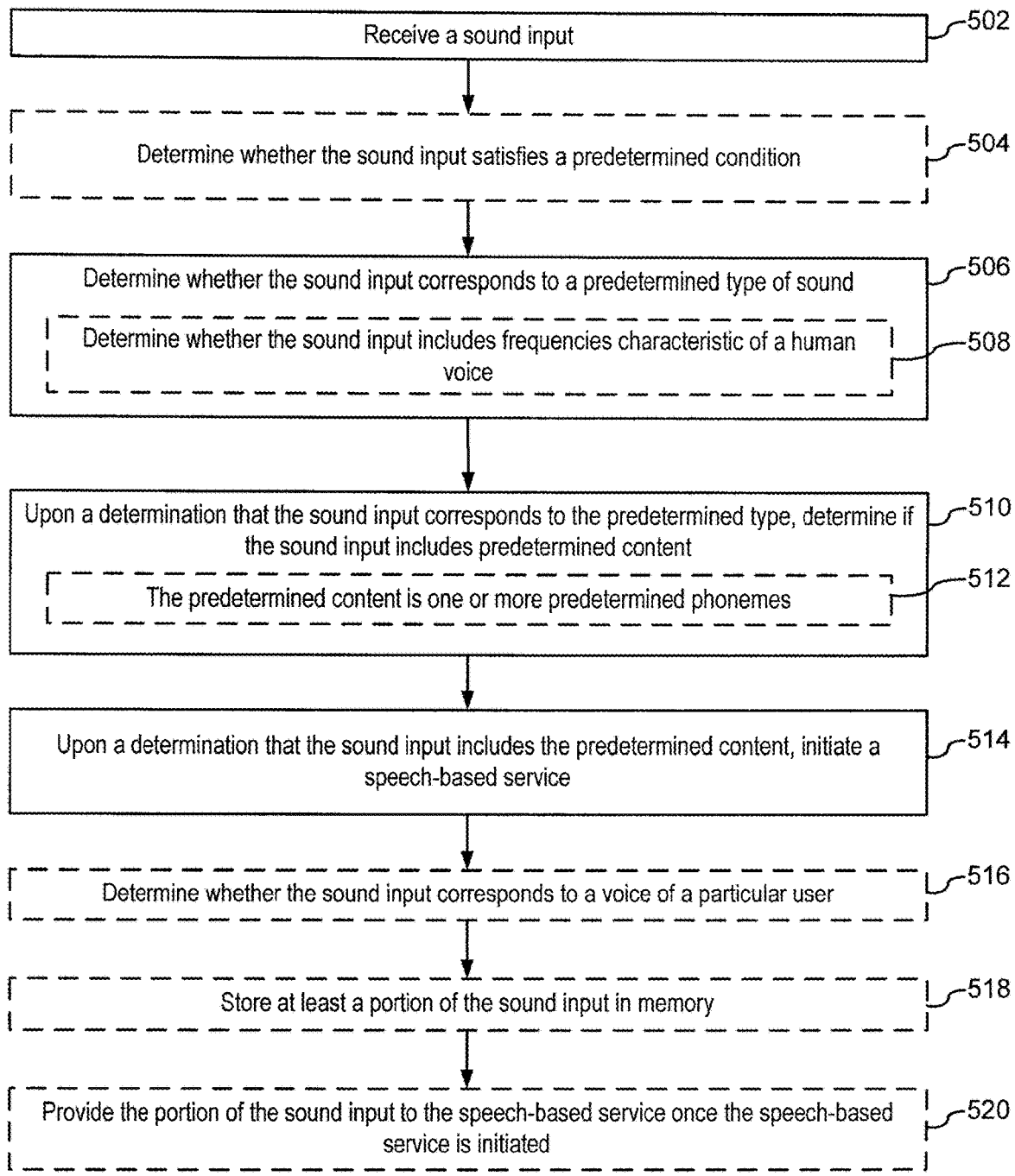
FIGS. 5-7 are flow charts illustrating methods for operating a voice trigger system, in accordance with some implementations.
Figure 6:
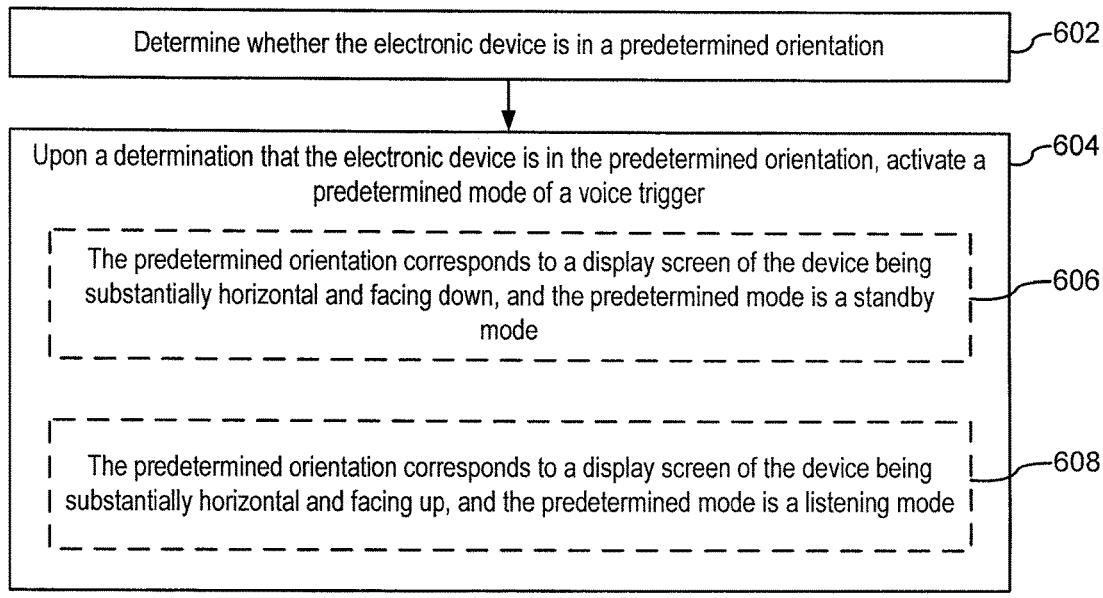
Figure 7:
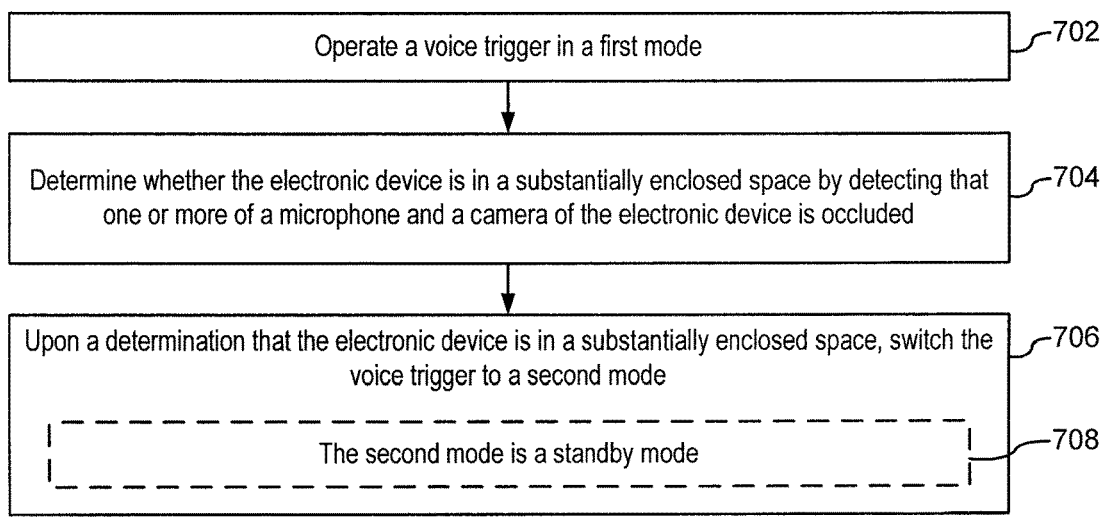

In some implementations, adaptation techniques such as those described above require more resources than the voice trigger system 400 is able to or is configured to provide. In particular, the sound detectors may not have, or have access to, the amount or the types of processors, data, or memory that are necessary to perform the iterative adaptation of a reference representation and/or a sound detection algorithm (or any other appropriate aspect of the voice trigger system 400). Thus, in some implementations, one or more of the above described adaptation techniques are performed by a more powerful processor, such as an application processor (e.g., the processor(s) 204), or by a different device (e.g., the server system 108). However, the voice trigger system 400 is designed to operate even when the application processor is in a standby mode. Thus, the sound inputs which are to be used to adapt the voice trigger system 400 are received when the application processor is not active and cannot process the sound input. Accordingly, in some implementations, the sound input is stored by the device so that it can be further processed and/or analyzed after it is received. In some implementations, the sound input is stored in the memory buffer 414 of the audio subsystem 226. In some implementations, the sound input is stored in system memory (e.g., memory 250, FIG. 2) using direct memory access (DMA) techniques (including, for example, using a DMA engine so that data can be copied or moved without requiring the application processor to be initiated). The stored sound input is then provided to or accessed by the application processor (or the server system 108, or another appropriate device) once it is initiated so that the application processor can execute one or more of the adaptation techniques described above. In some implementations, FIGS. 5-7 are flow diagrams representing methods for operating a voice trigger, according to certain implementations. The methods are, optionally, governed by instructions that are stored in a computer memory or non-transitory computer readable storage medium (e.g., memory 250 of client device 104, memory 302 associated with the digital assistant system 300) and that are executed by one or more processors of one or more computer systems of a digital assistant system, including, but not limited to, the server system 108, and/or the user device 104*a*. The computer readable storage medium may include a magnetic or optical disk storage device, solid state storage devices such as Flash memory, or other non-volatile memory device or devices.

The computer readable instructions stored on the computer readable storage medium may include one or more of: source code, assembly language code, object code, or other instruction format that is interpreted by one or more processors. In various implementations, some operations in each method may be combined and/or the order of some operations may be changed from the order shown in the figures. Also, in some implementations, operations shown in separate figures and/or discussed in association with separate methods may be combined to form other methods, and operations shown in the same figure and/or discussed in association with the same method may be separated into different methods. Moreover, in some implementations, one or more operations in the methods are performed by modules of the digital assistant system 300 and/or an electronic device (e.g., the user device 104), including, for example, the natural language processing module 332, the dialogue flow processing module 334, the audio subsystem 226, the noise detector 402, the sound-type detector 404, the trigger sound detector 406, the speech-based service 408, and/or any sub modules thereof FIG. 5 illustrates a method 500 of operating a voice trigger system (e.g., the voice trigger system 400, FIG. 4), according to some implementations. In some implementations, the method 500 is performed at an electronic device including one or more processors and memory storing instructions for execution by the one or more processors (e.g., the electronic device 104). The electronic device receives a sound input (502). The sound input may correspond to a spoken utterance (e.g., a word, phrase, or sentence), a human generated sound (e.g., whistle, tongue click, finger snap, clap, etc.), or any other sound (e.g., an electronically generated chirp, a mechanical noise maker, etc.). In some implementations, the electronic device receives the sound input via the audio subsystem 226 (including, for example, the codec 410, audio DSP 412, and buffer 414, as well as the microphones 230 and 418, described in reference to FIG. 4).

In some implementations, the electronic device determines whether the sound input satisfies a predetermined condition (504). In some implementations, the electronic device applies time-domain analysis to the sound input to determine whether the sound input satisfies the predetermined condition. For example, the electronic device analyzes the sound input over a time period in order to determine whether the sound amplitude reaches a predetermined level. In some implementations, the threshold is satisfied if the amplitude (e.g., the volume) of the sound input meets and/or exceeds a predetermined threshold. In some implementations, it is satisfied if the sound input meets and/or exceeds a predetermined threshold for a predetermined amount of time. As discussed in more detail below, in some implementations, determining whether the sound input satisfies the predetermined condition (504) is performed by a third sound detector (e.g., the noise detector 402). (The third sound detector is used in this case to differentiate the sound detector from other sound detectors (e.g., the first and second sound detectors that are discussed below), and does not necessarily indicate any operational position or order of the sound detectors.)

The electronic device determines whether the sound input corresponds to a predetermined type of sound (506). As noted above, sounds are categorized as different "types" based on certain identifiable characteristics of the sounds. Determining whether the sound input corresponds to a predetermined type includes determining whether the sound input includes or exhibits the characteristics of a particular type. In some implementations, the predetermined type of sound is a human voice. In such implementations, determining whether the sound input corresponds to a human voice includes determining whether the sound input includes frequencies characteristic of a human voice (508). As discussed in more detail below, in some implementations, determining whether the sound input corresponds to a predetermined type of sound (506) is performed by a first sound detector (e.g., the sound-type detector 404).

Upon a determination that the sound input corresponds to the predetermined type of sound, the electronic device determines whether the sound input includes predetermined content (510). In some implementations, the predetermined content corresponds to one or more predetermined phonemes (512). In some implementations, the one or more predetermined phonemes constitute at least one word. In some implementations, the predetermined content is a sound (e.g., a whistle, click, or clap). In some implementations, as discussed below, determining whether the sound input includes predetermined content (510) is performed by a second sound detector (e.g., the trigger sound detector 406).

Upon a determination that the sound input includes the predetermined content, the electronic device initiates a speech-based service (514). In some implementations, the speech-based service is a voice-based digital assistant, as described in detail above. In some implementations, the speech-based service is a dictation service in which speech inputs are converted into text and included in and/or displayed in a text input field (e.g., of an email, text message, word processing or note-taking application, etc.). In implementations where the speech-based service is a voice-based digital assistant, once the voice-based digital assistant is initiated, a prompt is issued to the user (e.g., a sound or a speech prompt) indicating that the user may provide a voice input and/or command to the digital assistant. In some implementations, initiating the voice-based digital assistant includes activating an application processor (e.g., the processor(s) 204, FIG. 2), initiating one or more programs or modules (e.g., the digital assistant client module 264, FIG. 2), and/or establishing a connection to remote servers or devices (e.g., the digital assistant server 106, FIG. 1).

In some implementations, the electronic device determines whether the sound input corresponds to a voice of a particular user (516). For example, one or more voice authentication techniques are applied to the sound input to determine whether it corresponds to the voice of an authorized user of the device. Voice authentication techniques are described in greater detail above. In some implementations, voice authentication is performed by one of the sound detectors (e.g., the trigger sound detector 406). In some implementations, voice authentication is performed by a dedicated voice authentication module (including any appropriate hardware and/or software).

In some implementations, the sound-based service is initiated in response to a determination that the sound input includes the predetermined content and the sound input corresponds to the voice of the particular user. Thus, for example, the sound-based service (e.g., a voice-based digital assistant) will only be initiated when the trigger word or phrase is spoken by an authorized user. This reduces the possibility that the service can be invoked by an unauthorized user, and may be particularly useful when multiple electronic devices are in close proximity, as one user's utterance of a trigger sound will not activate another user's voice trigger.

In some implementations, where the speech-based service is a voice-based digital assistant, in response to determining that the sound input includes the predetermined content but does not correspond to the voice of the particular user, the voice-based digital assistant is initiated in a limited access mode. In some implementations, the limited access mode allows the digital assistant to access only a subset of the data, services, and/or functionality that the digital assistant can otherwise provide. In some implementations, the limited access mode corresponds to a write-only mode (e.g., so that an unauthorized user of the digital assistant cannot access data from calendars, task lists, contacts, photographs, emails, text messages, etc.). In some implementations, the limited access mode corresponds to a sandboxed instance of a speech-based service, so that the speech-based service will not read from or write to a user's data, such as user data 266 on the device 104 (FIG. 2), or on any other device (e.g., user data 348, FIG. 3A, which may be stored on a remote server, such as the server system 108, FIG. 1).

In some implementations, in response to a determination that the sound input includes the predetermined content and the sound input corresponds to the voice of the particular user, the voice-based digital assistant outputs a prompt including a name of the particular user. For example, when a particular user is identified via voice authentication, the voice-based digital assistant may output a prompt such as "What can I help you with, Peter?", instead of a more generic prompt such as a tone, beep, or non-personalized voice prompt.

As noted above, in some implementations, a first sound detector determines whether the sound input corresponds to a predetermined type of sound (at step 506), and a second sound detector determines whether the sound detector includes the predetermined content (at step 510). In some implementations, the first sound detector consumes less power while operating than the second sound detector, for example, because the first sound detector uses a less processor-intensive technique than the second sound detector. In some implementations, the first sound detector is the sound-type detector 404, and the second sound detector is the trigger sound detector 406, both of which are discussed above with respect to FIG. 4. In some implementations, when they are operating, the first and/or the second sound detector periodically monitor an audio channel according to a duty cycle, as described above with reference to FIG. 4.

In some implementations, the first and/or the sound detector performs frequency-domain analysis of the sound input. For example, these sound detectors perform a Laplace, Z-, or Fourier transform to generate a frequency spectrum or to determine the spectral density of the sound input or a portion thereof. In some implementations, the first sound detector is a voice-activity detector that is configured to determine whether the sound input includes frequencies that are characteristic of a human voice (or other features, aspects, or properties of the sound input that are characteristic of a human voice).

In some implementations, the second sound detector is off or inactive until the first sound detector detects a sound input of the predetermined type. Accordingly, in some implementations, the method 500 includes initiating the second sound detector in response to determining that the sound input corresponds to the predetermined type. (In other implementations, the second sound detector is initiated in response to other conditions, or is continuously operated regardless of a determination from the first sound detector.) In some implementations, initiating the second sound detector includes activating hardware and/or software (including, for example, circuits, processors, programs, memory, etc.).

In some implementations, the second sound detector is operated (e.g., is active and is monitoring an audio channel) for at least a predetermined amount of time after it is initiated. For example, when the first sound detector determines that the sound input corresponds to a predetermined type (e.g., includes a human voice), the second sound detector is operated in order to determine if the sound input also includes the predetermined content (e.g., the trigger word). In some implementations, the predetermined amount of time corresponds to a duration of the predetermined content. Thus, if the predetermined content is the phrase "Hey, SIRI," the predetermined amount of time will be long enough to determine if that phrase was uttered (e.g., 1 or 2 seconds, or any another appropriate duration). If the predetermined content is longer, such as the phrase "Hey, SIRI, please wake up and help me out," the predetermined time will be longer (e.g., 5 seconds, or another appropriate duration). In some implementations, the second sound detector operates as long as the first sound detector detects sound corresponding to the predetermined type. In such implementations, for example, as long as the first sound detector detects human speech in a sound input, the second sound detector will process the sound input to determine if it includes the predetermined content.

As noted above, in some implementations, a third sound detector (e.g., the noise detector 402) determines whether the sound input satisfies a predetermined condition (at step 504). In some implementations, the third sound detector consumes less power while operating than the first sound detector. In some implementations, the third sound detector periodically monitors an audio channel according to a duty cycle, as discussed above with respect to FIG. 4. Also, in some implementations, the third sound detector performs time-domain analysis of the sound input. In some implementations, the third sound detector consumes less power than the first sound detector because time-domain analysis is less processor intensive than the frequency-domain analysis applied by the second sound detector.

Similar to the discussion above with respect to initiating the second sound detector (e.g., a trigger sound detector 406) in response to a determination by the first sound detector (e.g., the sound-type detector 404), in some implementations, the first sound detector is initiated in response to a determination by the third sound detector (e.g., the noise detector 402). For example, in some implementations, the sound-type detector 404 is initiated in response to a determination by the noise detector 402 that the sound input satisfies a predetermined condition (e.g., is above a certain volume for a sufficient duration). In some implementations, initiating the first sound detector includes activating hardware and/or software (including, for example, circuits, processors, programs, memory, etc.). In other implementations, the first sound detector is initiated in response to other conditions, or is continuously operated.

In some implementations, the device stores at least a portion of the sound input in memory (518). In some implementations, the memory is the buffer 414 of the audio subsystem 226 (FIG. 4). The stored sound input allows non-real-time processing of the sound input by the device. For example, in some implementations, one or more of the sound detectors read and/or receive the stored sound input in order to process the stored sound input. This may be particularly useful where an upstream sound detector (e.g., the trigger sound detector 406) is not initiated until part-way through receipt of a sound input by the audio subsystem 226. In some implementations, the stored portion of the sound input is provided to the speech-based service once the speech-based service is initiated (520). Thus, the speech-based service can transcribe, process, or otherwise operate on the stored portion of the sound input even if the speech-based service is not fully operational until after that portion of sound input has been received. In some implementations, the stored portion of the sound input is provided to an adaptation module of the electronic device.

In various implementations, steps (516)-(520) are performed at different positions within the method 500. For example, in some implementations, one or more of steps (516)-(520) are performed between steps (502) and (504), between steps (510) and (514), or at any other appropriate position.

FIG. 6 illustrates a method 600 of operating a voice trigger system (e.g., the voice trigger system 400, FIG. 4), according to some implementations. In some implementations, the method 600 is performed at an electronic device including one or more processors and memory storing instructions for execution by the one or more processors (e.g., the electronic device 104). The electronic device determines whether it is in a predetermined orientation (602). In some implementations, the electronic device detects its orientation using light sensors (including cameras), microphones, proximity sensors, magnetic sensors, accelerometers, gyroscopes, tilt sensors, and the like. For example, the electronic device determines whether it is resting face-down or face-up on a surface by comparing the amount or brightness of light incident on a sensor of a front-facing camera and the amount or brightness of light incident on a sensor of a rear-facing camera. If the amount and/or brightness detected by the front-facing camera is sufficiently greater than that detected by the rear-facing camera, the electronic device will determine that it is facing up. On the other hand, if the amount and/or brightness detected by the rear-facing camera is sufficiently greater than that of the front-facing camera, the device will determine that it is facing down.

Upon a determination that the electronic device is in the predetermined orientation, the electronic device activates a predetermined mode of a voice trigger (604). In some implementations, the predetermined orientation corresponds to a display screen of the device being substantially horizontal and facing down, and the predetermined mode is a standby mode (606). For example, in some implementations, if a smartphone or tablet is placed on a table or desk so that the screen is facing down, the voice trigger is placed in a standby mode (e.g., turned off) to prevent inadvertent activation of the voice trigger.

On the other hand, in some implementations, the predetermined orientation corresponds to a display screen of the device being substantially horizontal and facing up, and the predetermined mode is a listening mode (608). Thus, for example, if a smartphone or tablet is placed on a table or desk so that the screen is facing up, the voice trigger is placed in a listening mode so that it can respond to the user when it detects the trigger.

FIG. 7 illustrates a method 700 of operating a voice trigger (e.g., the voice trigger system 400, FIG. 4), according to some implementations. In some implementations, the method 700 is performed at an electronic device including one or more processors and memory storing instructions for execution by the one or more processors (e.g., the electronic device 104). The electronic device operates a voice trigger (e.g., the voice trigger system 400) in a first mode (702). In some implementations, the first mode is a normal listening mode.

The electronic device determines whether it is in a substantially enclosed space by detecting that one or more of a microphone and a camera of the electronic device is occluded (704). In some implementations, a substantially enclosed space includes a pocket, purse, bag, drawer, glovebox, briefcase, or the like.

As described above, in some implementations, a device detects that a microphone is occluded by emitting one or more sounds (e.g., tones, clicks, pings, etc.) from a speaker or transducer, and monitoring one or more microphones or transducers to detect echoes of the omitted sound(s). For example, a relatively large environment (e.g., a room or a vehicle) will reflect the sound differently than a relatively small, substantially enclosed environment (e.g., a purse or pocket). Thus, if the device detects that the microphone (or the speaker that emitted the sounds) is occluded based on the echoes (or lack thereof), the device determines that it is in a substantially enclosed space. In some implementations, the device detects that a microphone is occluded by detecting that the microphone is picking up a sound characteristic of an enclosed space. For example, when a device is in a pocket, the microphone may detect a characteristic rustling noise due to the microphone coming into contact or close proximity with the fabric of the pocket.

In some implementations, a device detects that a camera is occluded based on the level of light received by a sensor, or by determining whether it can achieve a focused image. For example, if a camera sensor detects a low level of light during a time when a high level of light would be expected (e.g., during daylight hours), then the device determines that the camera is occluded, and that the device is in a substantially enclosed space. As another example, the camera may attempt to achieve an in-focus image on its sensor. Usually, this will be difficult if the camera is in an extremely dark place (e.g., a pocket or backpack), or if it is too close to the object on which it is attempting to focus (e.g., the inside of a purse or backpack). Thus, if the camera is unable to achieve an in-focus image, it determines that the device is in a substantially enclosed space.

Upon a determination that the electronic device is in a substantially enclosed space, the electronic device switches the voice trigger to a second mode (706). In some implementations, the second mode is a standby mode (708). In some implementations, when in the standby mode, the voice trigger system 400 will continue to monitor ambient audio, but will not respond to received sounds regardless of whether they would otherwise trigger the voice trigger system 400. In some implementations, in the standby mode, the voice trigger system 400 is deactivated, and does not process audio to detect trigger sounds. In some implementations, the second mode includes operating one or more sound detectors of a voice trigger system 400 according to a different duty cycle than the first mode. In some implementations, the second mode includes operating a different combination of sound detectors than the first mode.

In some implementations, the second mode corresponds to a more sensitive monitoring mode, so that the voice trigger system 400 can detect and respond to a trigger sound even though it is in a substantially enclosed space.

In some implementations, once the voice trigger is switched to the second mode, the device periodically determines whether the electronic device is still in a substantially enclosed space by detecting whether one or more of a microphone and a camera of the electronic device is occluded (e.g., using any of the techniques described above with respect to step (704)). If the device remains in a substantially enclosed space, the voice trigger system 400 will be kept in the second mode. In some implementations, if the device is removed from a substantially enclosed space, the electronic device will return the voice trigger to the first mode.

Figure 8:
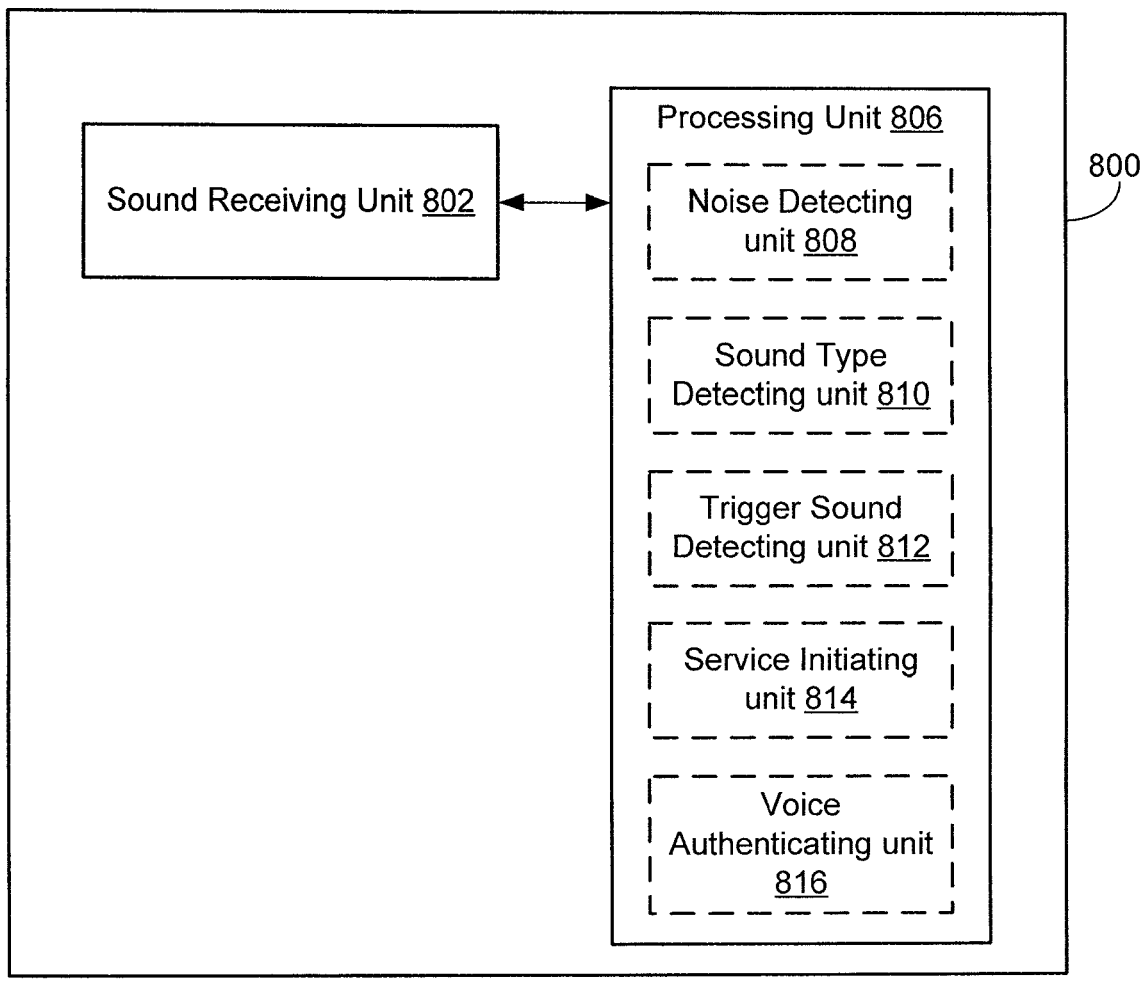
FIGS. 8-9 are functional block diagrams of electronic devices in accordance with some embodiments.

In accordance with some implementations, FIG. 8 shows a functional block diagram of an electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, the electronic device 800 includes a sound receiving unit 802 configured to receive sound input. The electronic device 800 also includes a processing unit 806 coupled to the speech receiving unit 802. In some implementations, the processing unit 806 includes a noise detecting unit 808, a sound type detecting unit 810, a trigger sound detecting unit 812, a service initiating unit 814, and a voice authenticating unit 816. In some implementations, the noise detecting unit 808 corresponds to the noise detector 402, discussed above, and is configured to perform any operations described above with reference to the noise detector 402. In some implementations, the sound type detecting unit 810 corresponds to the sound-type detector 404, discussed above, and is configured to perform any operations described above with reference to the sound-type detector 404. In some implementations, the trigger sound detecting unit 812 corresponds to the trigger sound detector 406, discussed above, and is configured to perform any operations described above with reference to the trigger sound detector 406. In some implementations, the voice authenticating unit 816 corresponds to the voice authentication module 428, discussed above, and is configured to perform any operations described above with reference to the voice authentication module 428.

The processing unit 806 is configured to: determine whether at least a portion of the sound input corresponds to a predetermined type of sound (e.g., with the sound type detecting unit 810); upon a determination that at least a portion of the sound input corresponds to the predetermined type, determine whether the sound input includes predetermined content (e.g., with the trigger sound detecting unit 812); and upon a determination that the sound input includes the predetermined content, initiate a speech-based service (e.g., with the service initiating unit 814).

In some implementations, the processing unit 806 is also configured to, prior to determining whether the sound input corresponds to a predetermined type of sound, determine whether the sound input satisfies a predetermined condition (e.g., with the noise detecting unit 808). In some implementations, the processing unit 806 is also configured to determine whether the sound input corresponds to a voice of a particular user (e.g., with the voice authenticating unit 816).

Figure 9:
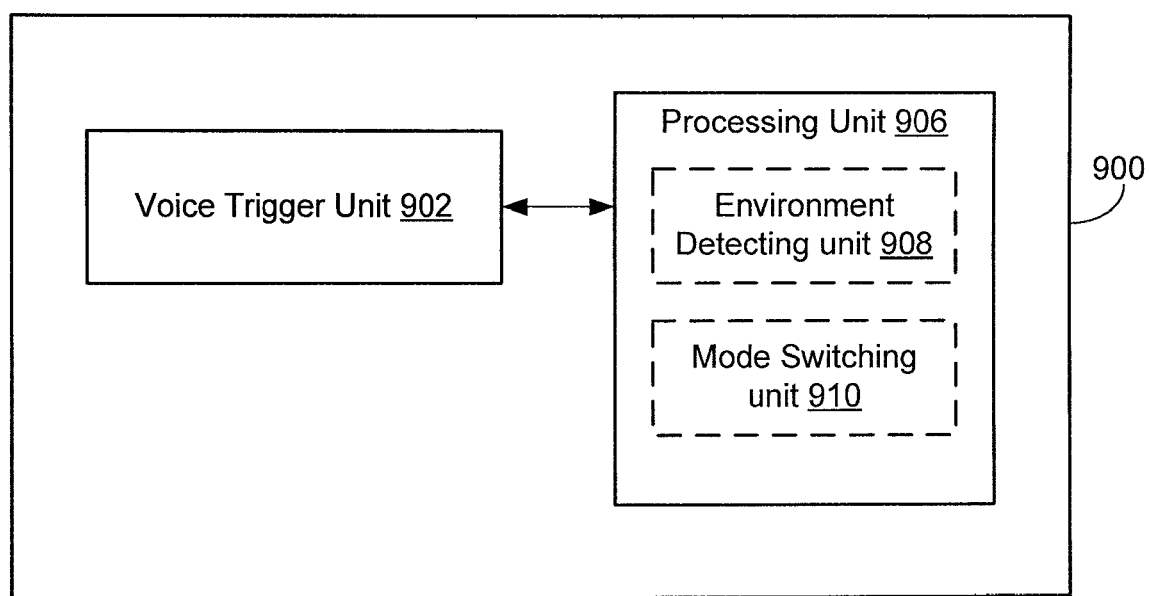

In accordance with some implementations, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, the electronic device 900 includes a voice trigger unit 902. The voice trigger unit 902 can be operated in various different modes. In a first mode, the voice trigger unit receives sound inputs and determines if they satisfy certain criteria (e.g., a listening mode). In a second mode, the voice trigger unit 902 does not receive and/or does not process sound inputs (e.g., a standby mode). The electronic device 900 also includes a processing unit 906 coupled to the voice trigger unit 902. In some implementations, the processing unit 906 includes an environment detecting unit 908, which may include and/or interface with one or more sensors (e.g., including a microphone, a camera, an accelerometer, a gyroscope, etc.) and a mode switching unit 910.

In some implementations, the processing unit 906 is configured to: determine whether the electronic device is in a substantially enclosed space by detecting that one or more of a microphone and a camera of the electronic device is occluded (e.g., with the environment detecting unit 908); and upon a determination that the electronic device is in a substantially enclosed space, switching the voice trigger to a second mode (e.g., with the mode switching unit 910).

In some implementations, the processing unit is configured to: determine whether the electronic device is in a predetermined orientation (e.g., with the environment detecting unit 908); and upon a determination that the electronic device is in the predetermined orientation, activate a predetermined mode of a voice trigger (e.g., with the mode switching unit 910).

The foregoing description, for purpose of explanation, has been described with reference to specific implementations. However, the illustrative discussions above are not intended to be exhaustive or to limit the disclosed implementations to the precise forms disclosed. Many modifications and variations are possible in view of the above teachings. The implementations were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one element from another. For example, a first sound detector could be termed a second sound detector, and, similarly, a second sound detector could be termed a first sound detector, without changing the meaning of the description, so long as all occurrences of the "first sound detector" are renamed consistently and all occurrences of the "second sound detector" are renamed consistently. The first sound detector and the second sound detector are both sound detectors, but they are not the same sound detector.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method for operating a voice trigger, the method performed at an electronic device including one or more processors and memory storing instructions for execution by the one or more processors, the method comprising:
    operating the voice trigger in a first mode;
    while operating the voice trigger in the first mode, determining that the electronic device is within physical proximity of a second electronic device, wherein the second electronic device operates a second voice trigger; and
    in accordance with a determination that the electronic device is within physical proximity of the second electronic device:
        switching the voice trigger to a second mode.

2. The method of claim 1, wherein the electronic device includes a first microphone, the method further comprising:
    while operating the voice trigger in the first mode and while the electronic device is coupled to an external electronic device including a second microphone, monitoring audio input using the first microphone; and
    in accordance with a determination that the audio input includes predetermined content:
        initiating a speech based service;
        causing the second microphone to monitor second audio input; and
        ceasing to monitor the audio input using the first microphone.

3. The method of claim 1, wherein the electronic device includes a first microphone, the method further comprising:
    while operating the voice trigger in the first mode:
        monitoring first audio input using the first microphone to determine whether the first audio input includes predetermined content; and
        while the electronic device is coupled to an external electronic device including a second microphone:
            in accordance with a determination that a predetermined condition is satisfied:
                causing the second microphone to monitor second audio input to determine whether the second audio input includes the predetermined content; and
                ceasing to monitor the first audio input using the first microphone.

4. The method of claim 3, wherein determining that the predetermined condition is satisfied includes determining that the external electronic device is currently worn by a user.

5. The method of claim 4, wherein determining that the external electronic device is currently worn by the user includes:
  determining a difference between motion of the electronic device and motion of the external electronic device.

6. The method of claim 3, further comprising:
  in accordance with a determination that the second audio input includes the predetermined content:
    initiating a speech based service operating on the electronic device.

7. The method of claim 6, wherein the speech based service includes a digital assistant.

8. The method of claim 3, wherein the external electronic device includes a headset.

9. The method of claim 3, wherein the predetermined content includes one or more words.

10. The method of claim 1, wherein the first mode includes a listening mode.

11. The method of claim 1, wherein the second mode includes a standby mode.

12. The method of claim 1, wherein determining that the electronic device is within physical proximity of the second electronic device includes:
  determining physical proximity to the second electronic device using RFID communication.

13. The method of claim 1, wherein determining that the electronic device is within physical proximity of the second electronic device includes:
  determining physical proximity to the second electronic device using near field communication.

14. A non-transitory computer-readable storage medium storing one or more programs for execution by one or more processors of an electronic device, the one or more programs including instructions for:
  operating a voice trigger in a first mode;
  while operating the voice trigger in the first mode, determining that the electronic device is within physical proximity of a second electronic device, wherein the second electronic device operates a second voice trigger; and
  in accordance with a determination that the electronic device is within physical proximity of the second electronic device:
    switching the voice trigger to a second mode.

15. The non-transitory computer-readable storage medium of claim 14, wherein the electronic device includes a first microphone, and wherein the one or more programs further include instructions for:
  while operating the voice trigger in the first mode and while the electronic device is coupled to an external electronic device including a second microphone, monitoring audio input using the first microphone; and
  in accordance with a determination that the audio input includes predetermined content:
    initiating a speech based service;
    causing the second microphone to monitor second audio input; and
    ceasing to monitor the audio input using the first microphone.

16. The non-transitory computer-readable storage medium of claim 14, wherein the electronic device includes a first microphone, and wherein the one or more programs further include instructions for:
  while operating the voice trigger in the first mode:
    monitoring first audio input using the first microphone to determine whether the first audio input includes predetermined content; and
    while the electronic device is coupled to an external electronic device including a second microphone:
      in accordance with a determination that a predetermined condition is satisfied:
        causing the second microphone to monitor second audio input to determine whether the second audio input includes the predetermined content; and
        ceasing to monitor the first audio input using the first microphone.

17. The non-transitory computer-readable storage medium of claim 16, wherein determining that the predetermined condition is satisfied includes determining that the external electronic device is currently worn by a user.

18. The non-transitory computer-readable storage medium of claim 17, wherein determining that the external electronic device is currently worn by the user includes:
  determining a difference between motion of the electronic device and motion of the external electronic device.

19. The non-transitory computer-readable storage medium of claim 16, wherein the one or more programs further include instructions for:
  in accordance with a determination that the second audio input includes the predetermined content:
    initiating a speech based service operating on the electronic device.

20. The non-transitory computer-readable storage medium of claim 19, wherein the speech based service includes a digital assistant.

21. The non-transitory computer-readable storage medium of claim 16, wherein the external electronic device includes a headset.

22. The non-transitory computer-readable storage medium of claim 16, wherein the predetermined content includes one or more words.

23. The non-transitory computer-readable storage medium of claim 14, wherein the first mode includes a listening mode.

24. The non-transitory computer-readable storage medium of claim 14, wherein the second mode includes a standby mode.

25. The non-transitory computer-readable storage medium of claim 14, wherein determining that the electronic device is within physical proximity of the second electronic device includes:
  determining physical proximity to the second electronic device using RFID communication.

26. The non-transitory computer-readable storage medium of claim 14, wherein determining that the electronic device is within physical proximity of the second electronic device includes:
  determining physical proximity to the second electronic device using near field communication.

27. An electronic device, comprising:
  one or more processors;
  memory; and
  one or more programs, wherein the one or more programs are stored in the memory and configured to be executed by the one or more processors, the one or more programs including instructions for:
    operating a voice trigger in a first mode;
    while operating the voice trigger in the first mode, determining that the electronic device is within physical proximity of a second electronic device, wherein the second electronic device operates a second voice trigger; and in accordance with a determination that the electronic device is within physical proximity of the second electronic device:
  switching the voice trigger to a second mode.

28. The electronic device of claim 27, wherein the electronic device includes a first microphone, and wherein the one or more programs further include instructions for:
  while operating the voice trigger in the first mode and while the electronic device is coupled to an external electronic device including a second microphone, monitoring audio input using the first microphone; and
  in accordance with a determination that the audio input includes predetermined content:
    initiating a speech based service;
    causing the second microphone to monitor second audio input; and
    ceasing to monitor the audio input using the first microphone.

29. The electronic device of claim 27, wherein the electronic device includes a first microphone, and wherein the one or more programs further include instructions for:
  while operating the voice trigger in the first mode:
    monitoring first audio input using the first microphone to determine whether the first audio input includes predetermined content; and
    while the electronic device is coupled to an external electronic device including a second microphone:
      in accordance with a determination that a predetermined condition is satisfied:
        causing the second microphone to monitor second audio input to determine whether the second audio input includes the predetermined content; and
        ceasing to monitor the first audio input using the first microphone.

30. The electronic device of claim 29, wherein determining that the predetermined condition is satisfied includes determining that the external electronic device is currently worn by a user.

31. The electronic device of claim 30, wherein determining that the external electronic device is currently worn by the user includes:
  determining a difference between motion of the electronic device and motion of the external electronic device.

32. The electronic device of claim 29, wherein the one or more programs further include instructions for:
  in accordance with a determination that the second audio input includes the predetermined content:
    initiating a speech based service operating on the electronic device.

33. The electronic device of claim 32, wherein the speech based service includes a digital assistant.

34. The electronic device of claim 29, wherein the external electronic device includes a headset.

35. The electronic device of claim 29, wherein the predetermined content includes one or more words.

36. The electronic device of claim 27, wherein the first mode includes a listening mode.

37. The electronic device of claim 27, wherein the second mode includes a standby mode.

38. The electronic device of claim 27, wherein determining that the electronic device is within physical proximity of the second electronic device includes:
  determining physical proximity to the second electronic device using RFID communication.

39. The electronic device of claim 27, wherein determining that the electronic device is within physical proximity of the second electronic device includes:
  determining physical proximity to the second electronic device using near field communication.

* * * * *